United States Patent
Yamazaki et al.

(10) Patent No.: US 7,860,698 B2
(45) Date of Patent: Dec. 28, 2010

(54) NETWORK DESIGN PROCESSING DEVICE AND METHOD, AND PROGRAM THEREFOR

(75) Inventors: Toshiya Yamazaki, Kawasaki (JP); Toshiro Okada, Kawasaki (JP); Takao Uehara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 540 days.

(21) Appl. No.: 11/976,624

(22) Filed: Oct. 25, 2007

(65) Prior Publication Data

US 2008/0091387 A1 Apr. 17, 2008

(51) Int. Cl.
G06F 17/50 (2006.01)
G06G 7/62 (2006.01)

(52) U.S. Cl. .................. 703/13; 709/223; 715/734

(58) Field of Classification Search .............. 703/13
See application file for complete search history.

(56) References Cited

U.S. PATENT DOCUMENTS

| | | | | |
|---|---|---|---|---|
| 5,841,981 | A * | 11/1998 | Kondo | 709/223 |
| 6,225,999 | B1 * | 5/2001 | Jain et al. | 715/734 |
| 6,363,421 | B2 * | 3/2002 | Barker et al. | 709/223 |
| 6,850,253 | B1 * | 2/2005 | Bazerman et al. | 715/734 |
| 6,857,014 | B1 * | 2/2005 | Paterson et al. | 709/223 |
| 7,076,400 | B2 * | 7/2006 | Dulberg et al. | 702/184 |
| 7,139,819 | B1 * | 11/2006 | Luo et al. | 709/223 |
| 7,289,436 | B2 * | 10/2007 | Schaller et al. | 370/225 |
| 7,315,985 | B1 * | 1/2008 | Gauvin et al. | 715/734 |
| 7,334,222 | B2 * | 2/2008 | Keller | 717/135 |
| 2003/0112958 | A1 * | 6/2003 | Beaudoin et al. | 379/221.15 |

FOREIGN PATENT DOCUMENTS

| | | |
|---|---|---|
| JP | 5-204721 | 8/1993 |
| JP | 6-187396 | 7/1994 |
| JP | 2002-368743 | 12/2002 |
| JP | 2003-101537 | 4/2003 |
| JP | 2004-40374 | 2/2004 |

OTHER PUBLICATIONS

Liu et al, "Visualization in Network Topology Optimization", Proceedings of the 1992 ACM Annual Conference on Communications, pp. 131-173, 1992.*
International Search Report (PCT/ISA/210) mailed Jun. 7, 2005 for International Application PCT/JP2005/007769.
International Preliminary Report on Patentability mailed on Nov. 8, 2007 and issued in corresponding International Patent Application No. PCT/JP2005/007769.

* cited by examiner

*Primary Examiner*—Mary C Jacob
(74) *Attorney, Agent, or Firm*—Staas & Halsey LLP

(57) ABSTRACT

In a network design processing device, a network drawing creation processing unit inputs the service communication setting information for business execution in a network system to be designed and the maintenance communication setting information for maintenance management of the network system, while differentiating two types of information on a network diagram, and displays the line joining the starting point and the ending point of communications in the network diagram in display modes different for the service communications and for the maintenance communications. The design diagram data expressing the network diagram inputted by the network diagram creation processing unit is stored in a design diagram data storage unit. Based on this, a design diagram analysis unit creates a design information DB. With reference to this design information database, a communication setting information check unit detects a setting error concerning the communication.

16 Claims, 31 Drawing Sheets

FIG.11

DEVICE TABLE 56

| OBJECT ID | NAME | TYPE | ADDRESS | CHILD OBJECT ID | PARENT OBJECT ID | STATUS INFORMATION |
|---|---|---|---|---|---|---|
| 1 | Internet | External net | any | | | |
| 3 | FireWall | Router | xxx.xxx.xxx.xxx/yy | 4,5 | | |
| 4 | FW-fw0 | NIC | xxx.xxx.xxx.xxx/yy | | 3 | |
| 5 | FW-fw1 | NIC | 164.77.53.1/27 | | 3 | |
| 7 | dns Server | Win Server | N/C | 8,9 | | |
| 8 | dns-Eth0 | NIC | | | 7 | |
| 9 | dns-Eth1 | NIC | 164.77.53.15/27 | | 7 | |
| 11 | Web Server | Win Server | | 12,13 | | |
| 12 | web-Eth0 | NIC | N/C | | 11 | |
| 13 | web-Eth1 | NIC | 164.77.53.15/27 | | 11 | |
| 15 | Global-net | Network(Hub) | 164.77.53.0/27 | | | |
| 17 | admin Server | Sol Server | | 18,19 | | |
| 18 | MT-hme0 | NIC | 164.77.53.5/27 | | 17 | |
| 19 | MT-hme1 | NIC | 192.168.100.5/24 | | 17 | |
| 21 | Private-net | Network(Hub) | 192.168.100.0/24 | | | |
| 23 | db Server | Sol Server | | 24,25 | | |
| 24 | db-hme0 | NIC | 192.168.100.10/24 | | 23 | |
| 25 | db-hme1 | NIC | N/C | | 23 | |

FIG.12

CONNECTION INFORMATION TABLE 57

| OBJECT ID | TYPE | END-POINT OBJECT ID | STATUS INFORMATION |
|---|---|---|---|
| 2 | TP CABLE | 1,4 | |
| 6 | TP CABLE | 5,15 | |
| 10 | TP CABLE | 9,15 | |
| 14 | TP CABLE | 13,15 | |
| 16 | TP CABLE | 15,18 | |
| 20 | TP CABLE | 19,21 | |
| 22 | TP CABLE | 21,24 | |

FIG.13

SESSION TABLE 58

| OBJECT ID | TYPE | PROTOCOL | STARTING POINT ID | ENDING POINT ID | OTHER INFORMATION | STATUS INFORMATION |
|---|---|---|---|---|---|---|
| 26 | service | tcp | 13 | 24 | port=any→1521 | |
| 27 | maintenance | tcp | 18 | 13 | port=any→22 | |
| 27 | maintenance | icmp | 18 | 13 | type=Echo | |
| 28 | maintenance | tcp | 18 | 9 | port=any→22 | |
| 28 | maintenance | icmp | 18 | 9 | type=Echo | |
| 29 | maintenance | tcp | 19 | 24 | port=any→22 | |
| 29 | maintenance | icmp | 19 | 24 | type=Echo | |

FIG.25

```
=> Router_generalFilters.txt <==
pass   tcp    164.77.53.8 port=any -> 192.168.100.10   port=1521
rt0:
    in     icmp    164.77.53.5 -> 164.77.53.2 command=Echo
    out    icmp    164.77.53.2 -> 164.77.53.5 command=EchoReply
rt1:
    in     icmp    192.168.100.5 -> 192.168.100.2 command=Echo
    out    icmp    192.168.100.2 -> 192.168.100.5 command=EchoReply
    in     tcp     192.168.100.5 port=any -> 192.168.100.2 port=23

=> web_generalFilters.txt <==
eth1:
    out    tcp     164.77.53.8 port=any -> 192.168.100.10   port=1521
    in     tcp     any port=any -> 154.77.53.8   port=80
    in     tcp     164.77.53.5 port=any -> 164.77.53.8  port=22
    in     icmp    164.77.53.5 -> 164.77.53.8  command=Echo
    out    icmp    164.77.53.8 -> 164.77.53.5  command=EchoReply => db_generalFilters.txt <==
    in     tcp     164.77.53.8 port=any -> 192.168.100.10   port=1521
    in     tcp     192.168.100.5 port=any -> 192.168.100.10 port=22
    in     icmp    192.168.100.5 -> 192.168.100.10 command=Echo
    out    icmp    192.168.100.10 -> 192.168.100.5 command=EchoReply
```

```
==> db_filters.txt <==
block in log level local3.notice quick from any to any with ipopts
block in log level local3.notice quick proto tcp from any to any with short block in log level local1.notice on hme0 all head 100
pass in proto tcp from 164.77.53.8 to 192.168.100.10 port = 1521 keep state group 100
pass in proto tcp from 192.168.100.5 to 192.168.100.10 port = 22 keep state group 100
pass in proto 192.168.100.5 to 192.168.100.10 group 100
pass out proto 192.168.100.10 to 192.168.100.5 group 100
```

FIG.31

REDUNDANT CONFIGURATION DATA

61 redundant1:
(parent)VirtualAddr: 164.77.53.1
(child)Real NIC: FireWall-fw1
FireWall2-fw1
type: master-slave
object ID: 100 redundant2:
(parent)VirtualAddr: 164.77.53.4
(child)Real NIC: Router-rt0
Router2-rt0
type: master-slave
object id: 100 redundant3:
(parent)VirtualAddr: 192.168.100.4
(child)Real NIC: Router-rt1
Rouer2-rt1
type: master-slave
object id: 100

NETWORK DESIGN PROCESSING DEVICE AND METHOD, AND PROGRAM THEREFOR

CROSS-REFERENCE TO RELATED APPLICATIONS

The present application claims the benefit of PCT international application number PCT/JP2005/007769 filed on Apr. 25, 2005, the subject matter of which is hereby incorporated herein by reference.

BACKGROUND OF THE INVENTION

1. Field of the Invention

The present invention relates to a network design processing device and method, and program therefor for supporting the network design/construction of computer systems. Particularly, the present invention relates to a technique for automatically detecting a setting error in a network in the network diagram of a designed computer system and for automatically detecting a non-redundant device.

2. Description of the Related Art

Conventionally, when computer systems are designed or constructed, the designers have created a network diagram and performed a network setting for each device using the created network diagram. Specifically, the designers have decided information for setting each device by reviewing the created network diagram based on an empirical approach, written out the information into a data table by hand, and then performed a setting for each device according to the information. The designers have repeated these tasks for each device one by one. This has imposed a great burden on the designers and caused problems with a large number of setting errors.

On the contrary, there are techniques for supporting designers in designing or constructing computer systems. Such techniques include a network configuration and design support system described in Patent Document 1.

This network configuration and design support system of Patent Document 1 is provided a network device graphics information file, in which pictures are stored that indicate the appearance or symbol of network component devices. The designers can create a network configuration diagram by selecting a desired picture from a graphics menu of the pictures on a display screen. This enables the designers to facilitate their tasks, such as the creation of network device configuration diagrams or the selection of hardware or software associated with the network construction.

The network configuration and design support system of Patent Document 1 also has means for validating a combination of attributes that are defined for each device, based on the attribute definition information for each device. The network configuration and design support system further comprises means for validating a connection relationship between devices, a communication relationship between software used by each device, and a reference relationship between data.

(Patent Document 1: Japanese Laid-Open H06-187396)

At the time of network design for the computer system, it is necessary, needless to say, to set correct addresses for all devices, but also to consider other configuration restrictions. This imposes a significant burden on the operators.

Additionally, it is possible to provide communications between devices when the devices are physically connected to each other via a network. However, it is also necessary to consider such restrictions for the device setting when there are some combinations of devices being desired to provide communications and others not, depending on the operational policies.

Further, displaying all communication settings on a single network diagram at a time makes the network diagram significantly complicated. This may result in a problem that a designer forgets to configure a communication setting or configures incorrectly in a communication setting.

On the other hand, as a countermeasure against abnormal conditions during the operation of the computer system, it is desirable to clarify a device at a network design stage, which affects other devices when a failure occurs.

The network configuration and design support system, disclosed in the above-mentioned Patent Document 1, has no function for preventing the oversight of communication settings or incorrect communication settings, or for detecting a critical point (CP) that causes a severe communication failure.

Particularly, in communications between devices, there is service session necessary for actual task execution during the operation of the system and maintenance session necessary for the system maintenance, which is different for respective communication purposes. Therefore, it is desirable to be able to provide setting, displaying, and checking of each session separately. However, the conventional technique could not handle the service session and the maintenance session as distinguished from each other in a network diagram. Thus, it could not also provide a display, which differentiates the two types of communications such that one part displays only the communication of the service session, and another displays only the communication of the maintenance session in the network diagram that is displayed on a display device.

It is an object of the present invention to solve the above problems and prevent the oversight of communication settings or incorrect communication settings at the time of network design for the computer system with greater ease than in the conventional technique.

It is another object of the present invention to differentiate, in a network diagram created with computer, the service session and the maintenance session to enable a separate setting, displaying, and checking of these sessions.

It is still another object of the present invention to provide a technique for detecting a device which may cause a severe communication failure due to the occurrence of failures at the time of network design for the computer system.

SUMMARY OF THE INVENTION

To solve the above problems, the present invention provides a network design processing device for automatically extracting network design information from a network diagram inputted through a computer screen. The network design processing device comprises: a network diagram creation processing unit for inputting service communication setting information for service execution in a network system to be designed and maintenance communication setting information for maintenance management of the network system distinctly and displaying each line connecting a starting point and an ending point of communications on the network diagram in different display modes for the service communications and for the maintenance communications; and a design diagram data storage unit for storing the design diagram data expressing the network diagram, the design diagram data including the service communication setting information and the maintenance communication setting information inputted by the network diagram creation processing unit. The present invention enables the easy and clear communication setting in a network design because the service communications and the maintenance communications are distinctly input and displayed on the network diagram.

Preferably, the present invention may comprise a selective communication display control unit for instructing to display the communication setting information for the communication in which a specific network device, such as a server, designated at the network diagram is the starting point or the ending point. When a selective communication display is instructed for a specific network device, the present invention displays the setting information for the communication having the designated specific network device as the starting point or the ending point is displayed on the network diagram, while the present invention hides the setting information for the other communications. The present invention enables only necessary communications to be displayed on the network diagram, thereby achieving the clearer network design.

Preferably, the present invention may have a unit for instructing to display the setting information for a specific communication designating the types of communication or communication protocol. When a selective communication display is instructed for a specific communication or protocol type, the present invention displays the setting information for the communication for the designated communication or protocol type on the network diagram, while the present invention hides the setting information for the other communications. The present invention enables an easy check of setting information related to the communications depending on the types of communication or communication protocol.

Preferably, the present invention may place the setting information for the input communication on a different layer of a plurality of layers forming the network diagram in accordance with the types of communication, communication protocol of the service communications, the maintenance communications, or the combination of the types of communication and communication protocol, and, for the display of the setting information for communications on the network diagram, select a specific layer or a group of layers to display on the network diagram. The present invention enables a prompt and easy display of setting information for communications on the network diagram.

Preferably, the present invention may store the design diagram data obtained from the network diagram in a design information database, detect a network device is detected that does not correspond to the starting point or the ending point of the communications, and displays such information on the network diagram that indicates the network device. The present invention may eliminate the oversight of communication settings.

Preferably, the present invention may analyze the service communication setting information that is stored in the design information database, search a server communicates which has communication from outside of a network system to be designed, further search another server which is chained and has communications with the server, then detect a remaining-server that deviates from such a communication-chain. Then, the present invention display information is displayed on the network diagram that indicates the server having no interaction with the outside world. Such a server is likely to be incorrect that has only closed communications within the system without any interaction with the outside world. The present invention enables an easy detection of such setting errors in communications.

Preferably, when the server deviating from the communication-chain is a device corresponding to the starting point of the maintenance communications, the present invention does not treat the device as a target for displaying the information that indicates no interaction with the outside world. That is because, for example, a maintenance monitoring server may not have any relationship with communications with the outside world.

Preferably, the present invention may analyze the maintenance communication setting information that is stored in the design diagram database. Then, the present invention may detect communications that have no path between the starting point and the ending point of the maintenance communications, or a device that does not correspond to the starting point or the ending point of the maintenance communications, and display information on the detection result on the network diagram. The present invention enables the designer to ascertain a device to which the maintenance communications may not be provided and eliminate the oversight of setting, thereby improving reliability of the network system.

Preferably, the present invention may cause a pseudo-failure for each device one by one based on the information for each device stored in the design information database, perform a path search to determine whether the service communications are established from the starting point to the ending point based on the service communication setting information with reference to the connection information for said each device, perform a failure simulation that detects the existence of any impossible service communications, and display the device with the pseudo-failure is displayed on the network diagram with a mark of critical point (CP) being added, when the impossible service communications are detected. The present invention enables the system designer to understand which machine could be a critical point and to add redundancy to the machine as needed, thereby improving its fault tolerance. In this case, the analysis for detecting and displaying a critical point with the failure simulation is performed only on the service communications, and not on the maintenance communications. That is because all devices could be a critical point when the maintenance sessions are subject to the failure simulation, since each maintenance session is normally accessed by the redundant devices independently.

According to the present invention, the service session and the maintenance session are described and displayed distinctly on the network diagram. Therefore, any input error in the setting information for their communications would be eliminated and the communication-related network design may be performed in an easier and clearer way.

BRIEF DESCRIPTION OF THE DRAWINGS

FIG. 11 is a chart illustrating an example of a device table to be stored in a design information DB.

FIG. 12 is a chart illustrating an example of a connection information table to be stored in the design information DB;

FIG. 13 is a chart illustrating an example of a session table to be stored in the design information DB.

FIG. 25 is a chart illustrating an example of generic filter setting information.

FIG. 26 is a chart illustrating an example of a filter setting file obtained from conversion of the generic filter setting information to an output format for specific filtering program.

FIG. 31 is a chart illustrating an example of redundant configuration data.

DETAILED DESCRIPTION OF THE PREFERRED EMBODIMENTS

Referring now to the accompanying drawings, embodiments of the present invention is described below.

Figure 1:
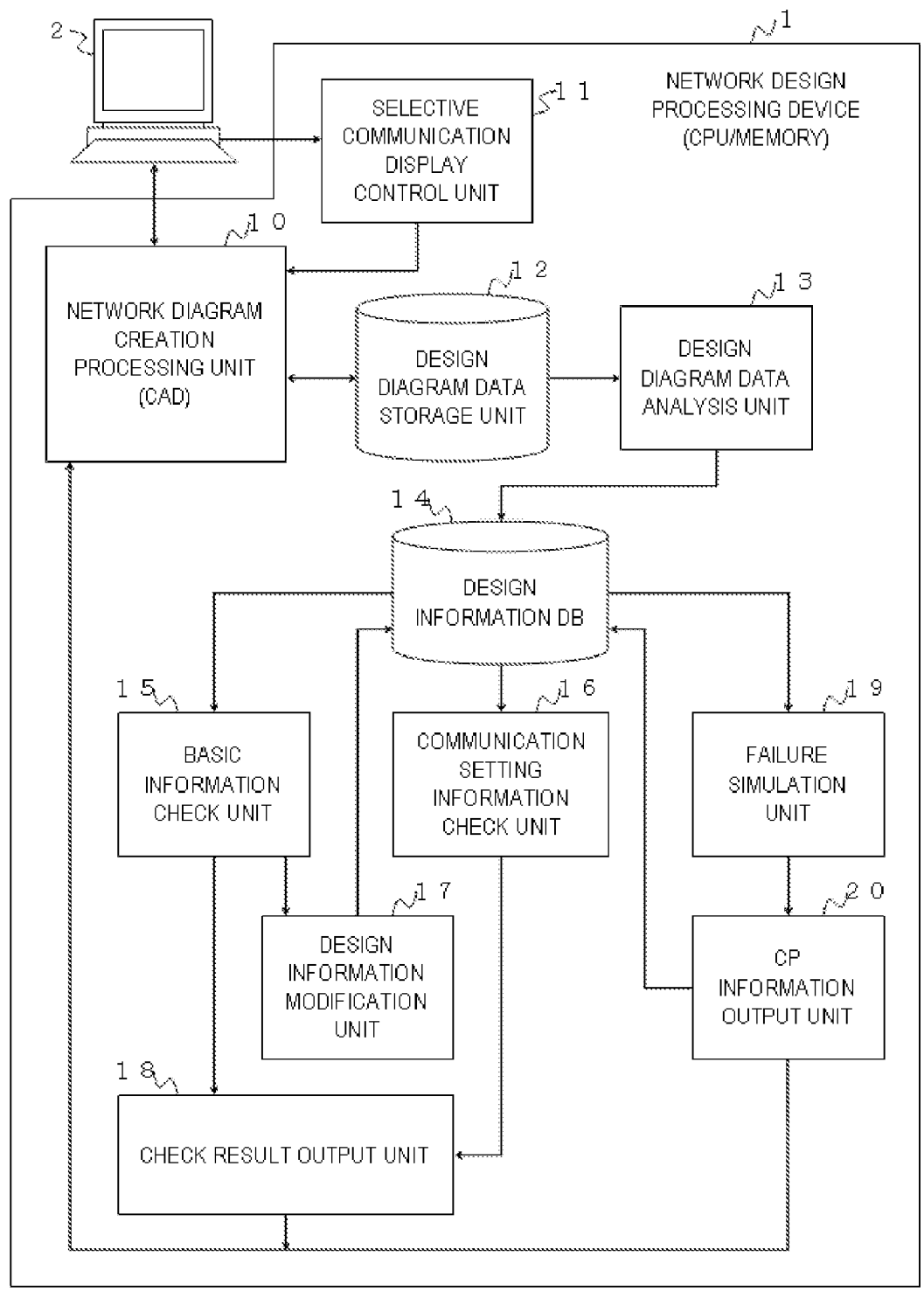
FIG. 1 is a diagram of an example of a structure of a network design processing device according to an embodiment of the present invention.
Figure 2:
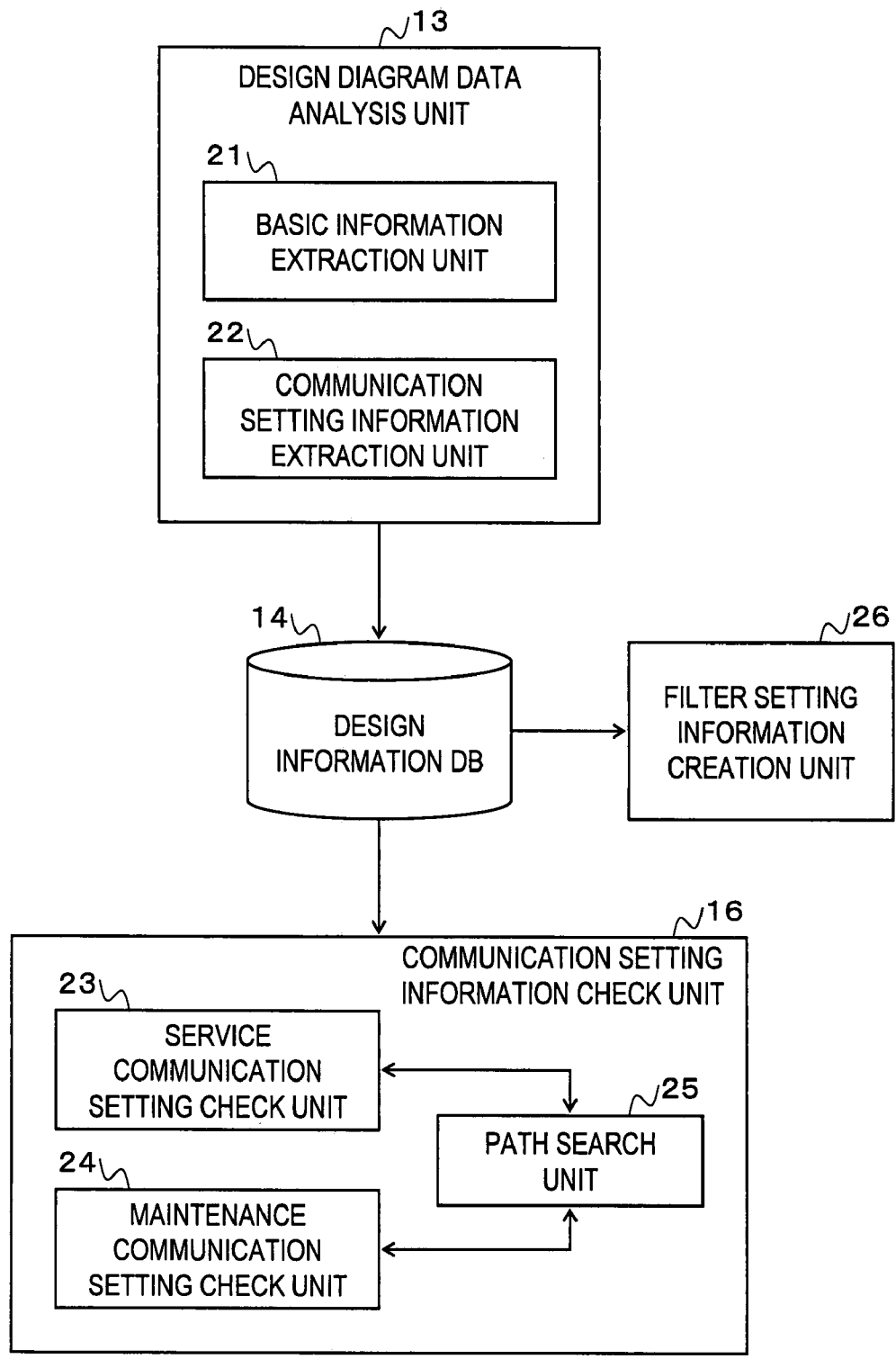
FIG. 2 is a diagram of an example focusing on a part of the network design processing device according to an embodiment of the present invention.

FIG. 1 is a diagram of an example of a structure of a network design processing device according to an embodiment of the present invention. FIG. 2 is a diagram of an example focusing on a part of the network design processing device according to an embodiment of the present invention.

A network design processing device 1 includes a network diagram creation processing unit 10, a selective communication display control unit 11, a design diagram data storage unit 12, a design diagram data analysis unit 13, a design information DB 14, a basic information check unit 15, a communication setting information check unit 16, a design information modification unit 17, a check result output unit 18, a failure simulation unit 19, and a CP information output unit 20. These are realized by a computer system of hardware and software, including a CPU, memory and so on. An input/output device 2 is connected to the network design processing device 1.

The design diagram data analysis unit 13 includes a basic information extraction unit 21 and a communication setting information extraction unit 22. The communication setting information check unit 16 comprises a service communication setting check unit 23, a maintenance communication setting check unit 24, and a path search unit 25. The network design processing device 1 also includes a filter setting information creation unit 26 which creates filter setting information for routers and so on with reference to the design information DB 14.

The network diagram creation processing unit 10 has a processing function of graphics processing software, such as CAD. The network diagram designer creates a network diagram by operating the network diagram creation processing unit 10 via the input/output device 2.

The selective communication display control unit 11 controls the network diagram creation processing unit 10 in such a way that only the communications instructed by the input/output device 2 would be selected and displayed on the network diagram on the screen of the input/output device 2.

The design diagram data storage unit 12 stores design diagram data including information of the network diagram that is created by the network diagram creation processing unit 10. The design diagram data includes graphics information and attributes information for each graphic element (hereafter referred to as an "object") which comprises the network diagram, and its data format is similar to that of being used in common CAD systems.

The design diagram data analysis unit 13 analyzes the design diagram data of the network diagram stored in the design diagram data storage unit 12 to extract design information. The extracted design information is stored in the design information DB 14. The basic information extraction unit 21 extracts basic information, such as information for each device described in the network diagram or physical connection information between devices. The communication setting information extraction unit 22 extracts communication setting information for the communications between devices described in the network diagram.

The design information DB 14 stores design information, such as the basic information extracted by the design diagram data analysis unit 13 or the communication setting information.

The basic information check unit 15 checks for any setting error in the basic information stored in the design information DB 14. As used herein, the term "basic information" refers to the information for each device set in the network diagram or the information for each connection cable which physically connects each device.

The communication setting information check unit 16 checks for any setting error in the communication setting information stored in the design information DB 14. As used herein, the term "communication setting information" refers to the information which defines communication sessions for the service communication setting or the maintenance communication setting which is set in the network diagram.

The service communication setting check unit 23 extracts the setting information for the service communications from the communication setting information stored in the design information DB 14 and checks for any setting error therein. The maintenance communication setting check unit 24 extracts the setting information for the maintenance communications from the communication setting information stored in the design information DB 14 and checks for any setting error therein. The path search unit 25 performs a path search for the designated communication setting.

The design information modification unit 17 automatically modifies any setting error in the design information DB 14 when that setting error could be automatically modified.

The check result output unit 18, for example, outputs the check result of the basic information from the basic information check unit 15 or the check result of the communication setting information from the communication setting information check unit 16.

The failure simulation unit 19 checks if the service communications can be provided which is set with the service communication setting, with a pseudo-failure being caused for each device in the network diagram one by one, and extracts a device which could be of non-redundant configuration (namely, a device which is a critical point (hereafter referred to as a "CP")). The term "CP" refers to a point where a significant task trouble would occur when the device in question fails.

The CP information output unit 20 writes the information on the device which is a CP extracted by the failure simulation unit 19 to the design information DB 14 and outputs the information to the screen of the input/output device 2 via the network diagram creation processing unit 10.

The filter setting information creation unit 26 creates filter setting information to be set for each device based on the design information DB 14.

The embodiment of the present invention will now be described in detail below with reference to FIG. 3 to FIG. 31.

Figure 3:
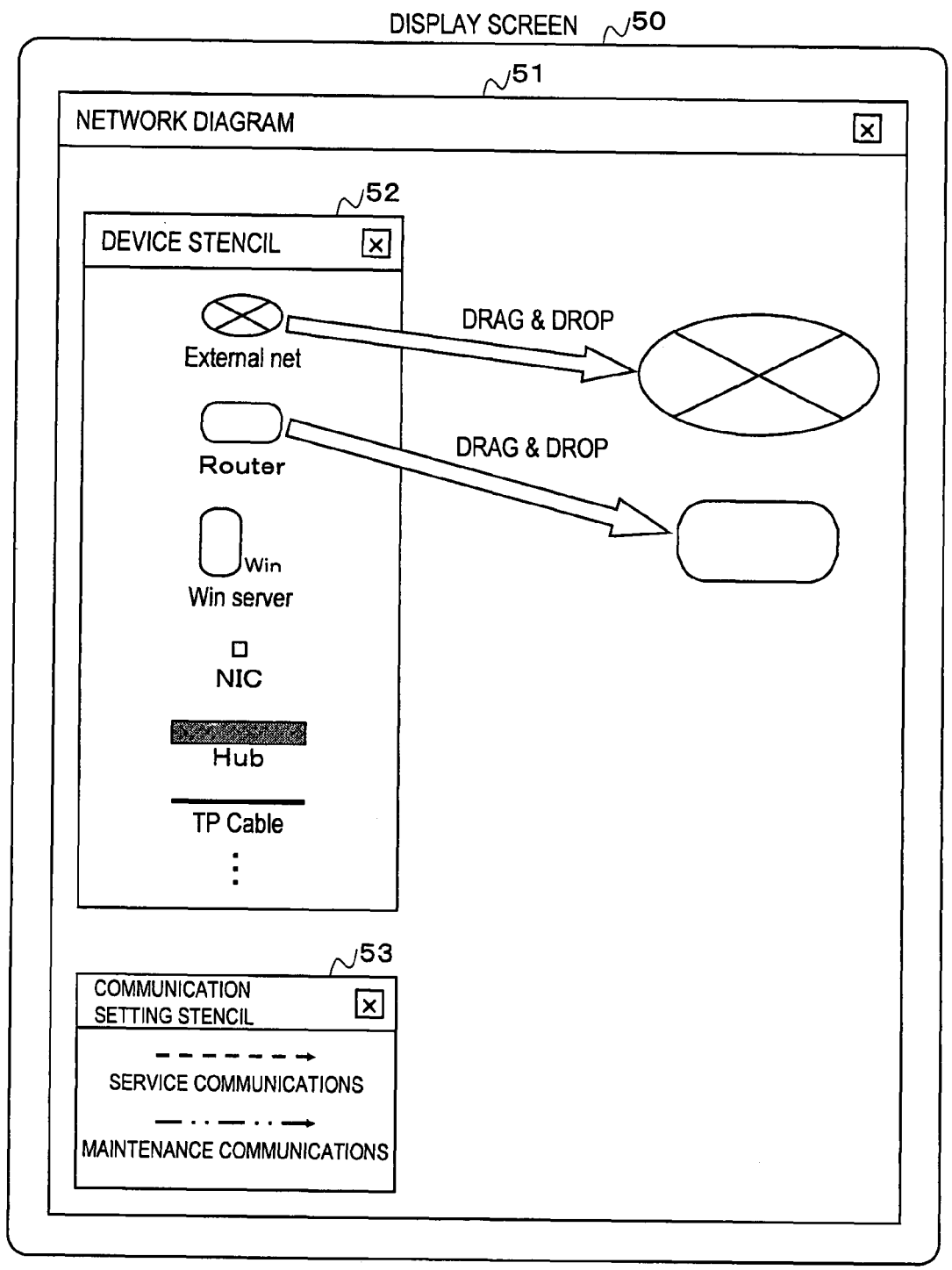
FIG. 3 is a diagram illustrating the creation of a network diagram.

FIG. 3 is a diagram illustrating the creation of a network diagram. In FIG. 3, a window 51 of the network diagram is opened on the display screen 50 of the input/output device 2. The designer creates the network diagram on the window 51 of the network diagram by operating the network diagram creation processing unit 10 via the input/output device 2. An example will be described below with respect to a mouse which has a left button and a right button, as a pointing device for creating the network diagram. Other pointing devices may be used to achieve the same operation.

The components of each device to be used in the network are listed in a window 52 of the device stencil. The components to be used in setting communications are listed in a window 53 of the communication setting stencil. The designer selects a component of the device to be placed in the network diagram from the window 52 of the device stencil, and places each component of the selected device in the network diagram by drag and drop operation. This network diagram creation method based on the CAD application is as used in the conventional methods.

The present invention can place each device being placed and connected to each other on the network diagram, and also can describe and set the service session and the maintenance session on the network diagram, while differentiating the two types of sessions.

Figure 4:
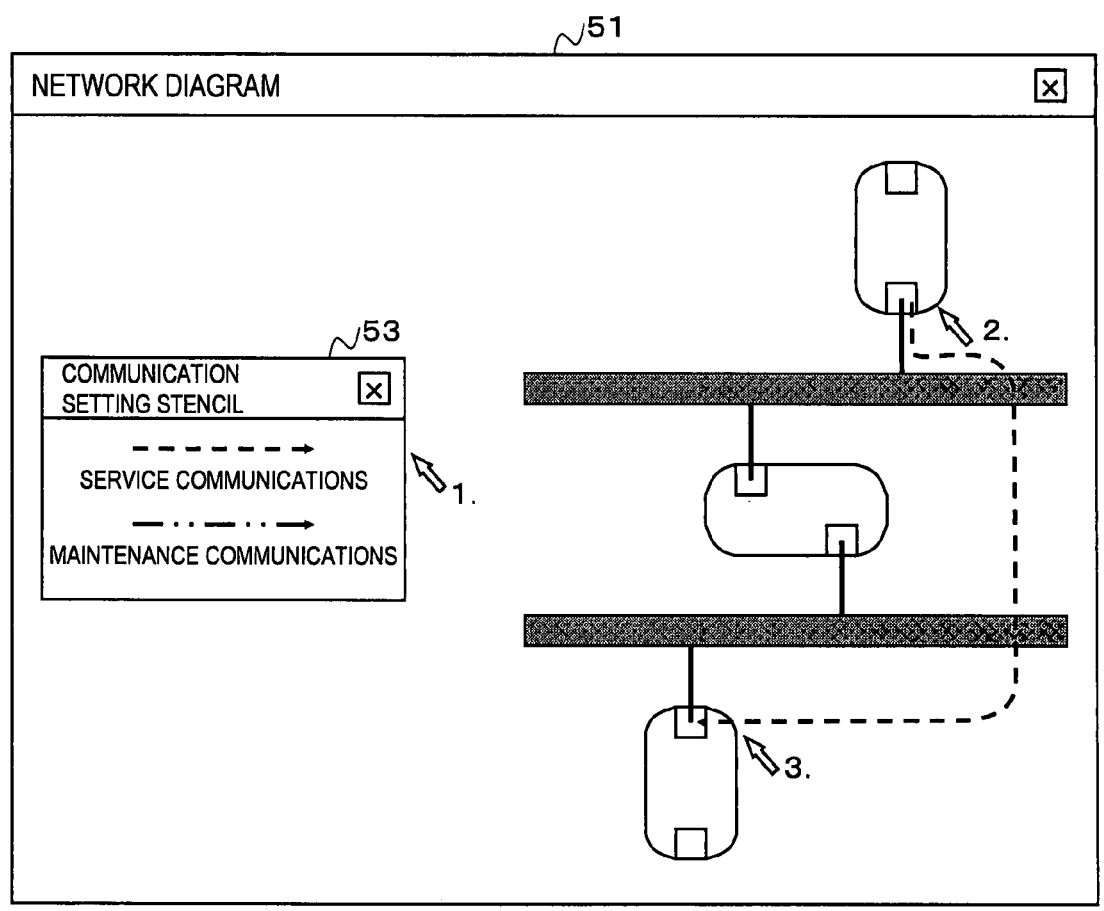
FIG. 4 is a diagram illustrating operational procedures for communication setting.

FIG. 4 is a diagram illustrating operational procedures for communication setting. First, the designer selects a communication component which the designer wants to set from the window 53 of the communication setting stencil with a mouse click (operational procedure 1). Then, the designer clicks the mouse on a part corresponding to the starting point of the communications in the network diagram (operational procedure 2). Lastly, the designer clicks the mouse on a part of corresponding to the ending point of the communications in the network diagram (operational procedure 3). Consequently, an arrow is displayed on the network diagram which points from the starting point to the ending point of the communications, and its communication setting information is stored in memory as design diagram data. The above-described operation method is merely an example, and other method may be used, for example, a method may be used where the end point of a communication object, which has been dragged and dropped on the network diagram, may be connected to the starting point/the ending point on the device by drag operation.

Figure 5:
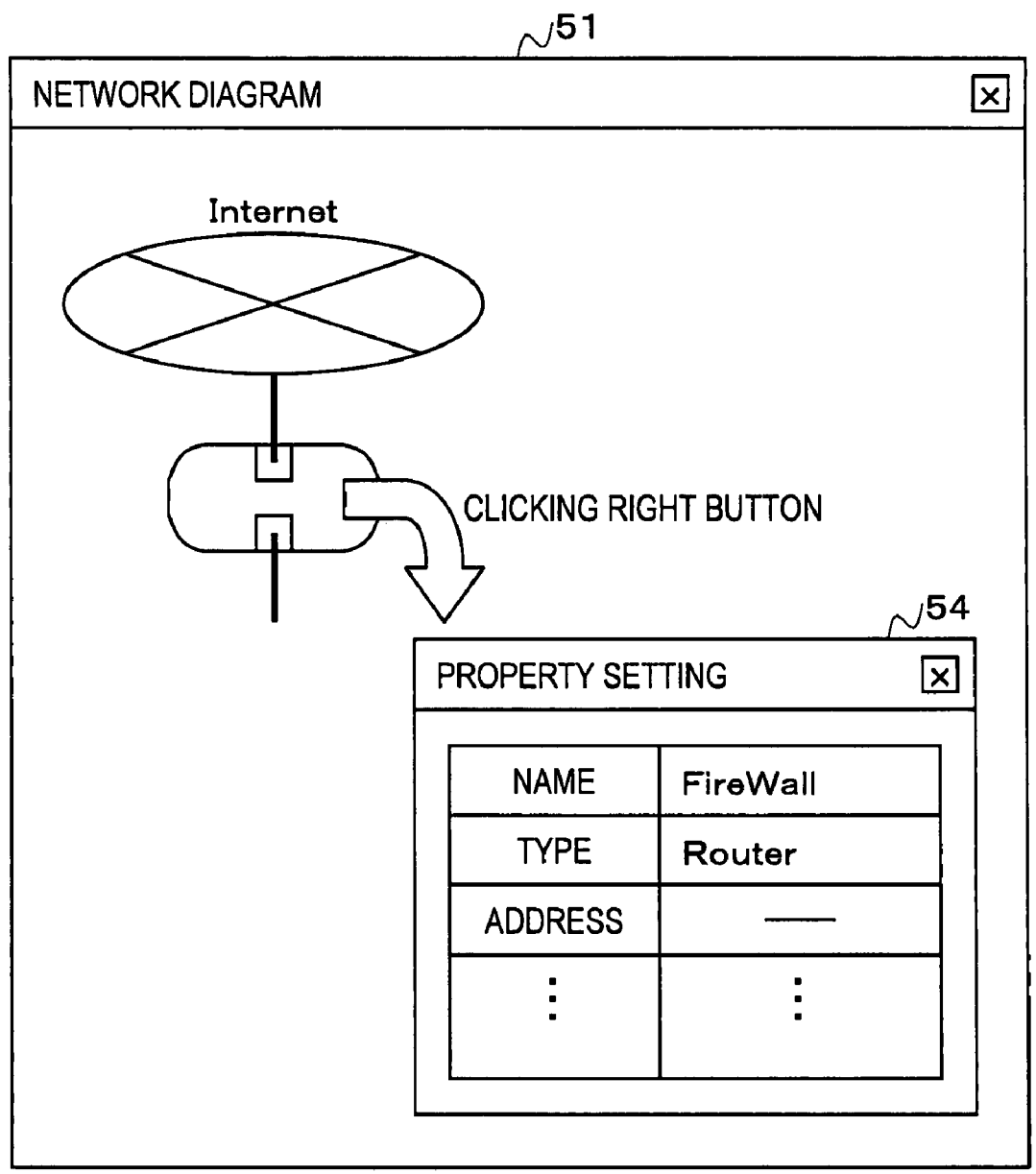
FIG. 5 is a diagram illustrating a property setting.

FIG. 5 is a diagram illustrating a property setting. The designer clicks the right mouse button (referred to as "right-click") on a device or communications on the network diagram for which he/she wants to perform the property setting, and then opens a window 54 of the property setting. The designer can set each attribute of the device or communications on the window 54 of the property setting.

The attributes information for each device and communications may be defined in advance for each component of the device stencil and the communication stencil. The defined information may be kept as component attributes information in an attributes file (not shown) which is managed by the network diagram creation processing unit 10. In the window 54 of the property setting, with respect to an attributes item which has been defined in advance for that attributes file, attributes information which is read from the attributes file is embedded in that attributes item as a default value. Therefore, the designer needs only to input attributes information specific to the individual devices or communications from the window 54 of the property setting, for example, minimal attributes information such as the host name or address information of the server.

Figure 6:
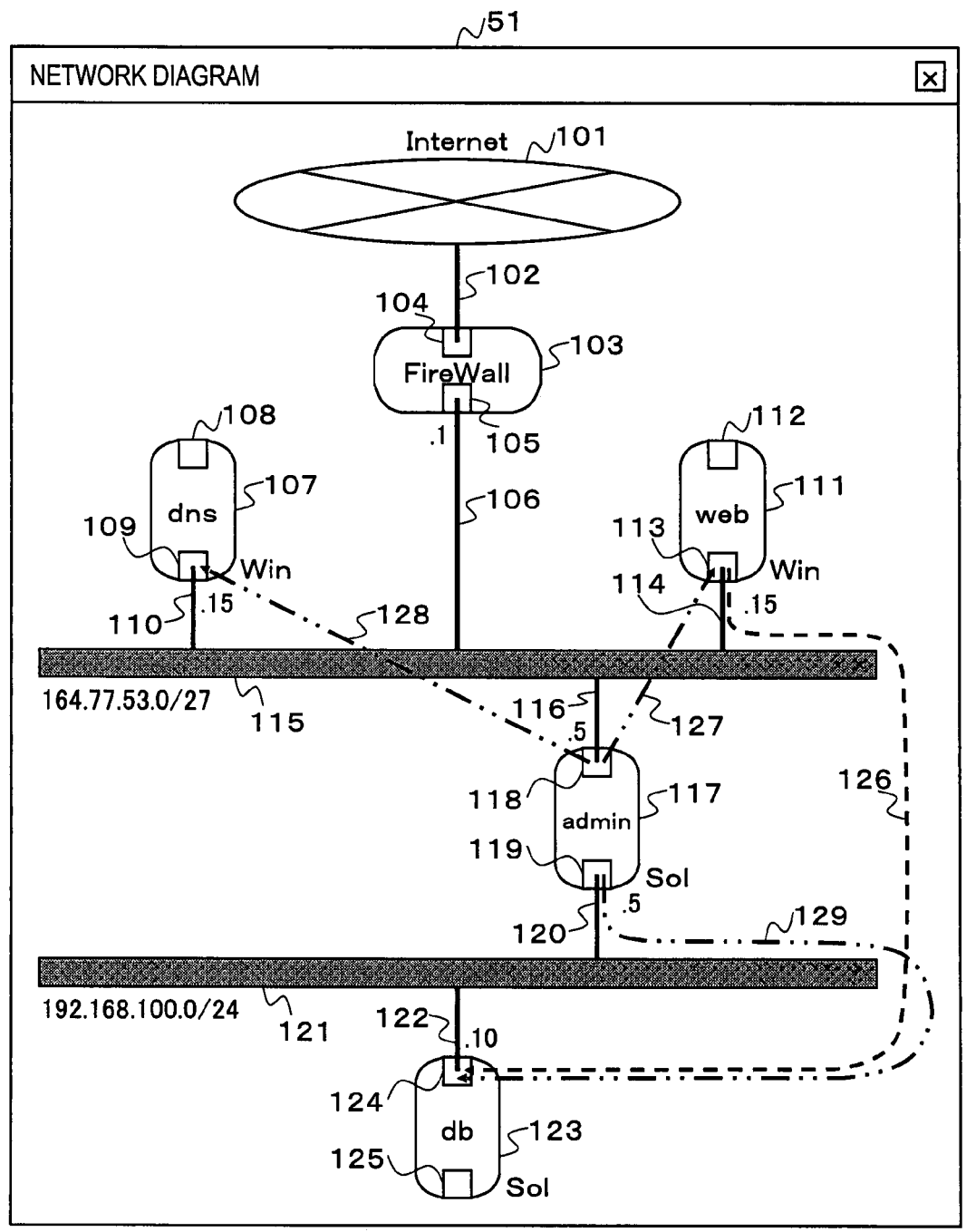
FIG. 6 is a diagram illustrating an example of the designed network diagram.

FIG. 6 is a diagram illustrating an example of the designed network diagram. For example, the network diagram as illustrated in FIG. 6 is created by the network diagram creation processing unit 10 with input information which is input by the designer of a network system via the input/output device 2. The design diagram data which defines the created network diagram is stored in the design diagram data storage unit 12.

In the network diagram illustrated in FIG. 6, the designed network system is connected to the external Internet 101 through a FireWall 103 having a router function via a connection cable 102.

A dns server 107, a web server 111 and a db server 123 are service-type servers for providing a service to an external customer. An admin server 117 is a maintenance-type server for performing the maintenance management such as for checking or making setting changes for each device which constitutes the network system. An admin server 117 needs to be set in a way that, in particular, external ingress communications would not be permitted.

The FireWall 103, dns server 107, web server 111, admin server 117 and db server 123 are each equipped with two network interface cards 104, 105, 108, 109, 112, 113, 118, 119, 124 and 125, respectively. Herein below, the network interface cards are referred to as "NICs".

The NICs 105, 109, 113 and 118 are each connected to a Hub 115 in the Global-net via connection cables 106, 110, 114 and 116, respectively. The NICs 119 and 124 are each connected to a Hub 121 in the Private-net via connection cables 120 and 122, respectively.

The IP address of the Global-net is "164.77.53.0/27". The lower five bits in IP addresses of NICs 105, 109, 113 and 118, which are connected to the Global-net, are each "0.1", "0.15", "0.15", "0.5", respectively.

The IP address of the Private-net is "192.168.100.0/24". The lower eight bits in IP addresses of NICs 119 and 124, which are connected to the Private-net, are each "0.5", "0.10", respectively. The information for these IP addresses is set in the window 54 of the property setting as described in FIG. 5.

Further, the designer describes the necessary communication settings for operating the network system by operating the network diagram creation processing unit 10 via the input/output device 2. The communication setting described in the network diagram is stored in the design diagram data storage unit 12 as the design diagram data. The necessary communication settings for the network system which are described by the designer on the network diagram enables the network design processing device 1 to check for any setting error in the network diagram and to automatically modify setting errors.

In the embodiment of the present invention, the two types of communication settings, namely, the service communication setting and the maintenance communication setting may be described distinctly on the network diagram. In the network diagram of FIG. 6, an arrow with dotted line represents the service communication setting, and another arrow with dashed-two dotted line represents the maintenance communication setting. In this way, by describing the service communication setting and the maintenance communication setting distinctly on the network diagram, various processing may be facilitated as described below.

In the network diagram of FIG. 6, a communication setting 126 is described as the service communication setting from the NIC 113 of the web server 111 to the NIC 124 of the db server 123. For the communication setting 126, TCP is set as the protocol.

Additionally, also described in the network diagram of FIG. 6 are a communication setting 127 from the NIC 118 of the admin server 117 to the NIC 113 of the web server 111, a communication setting 128 from the NIC 118 of the admin server 117 to the NIC 109 of the dns server 107, and a communication setting 129 from the NIC 119 of the admin server 117 to the NIC 124 of the db server 123 as the maintenance communication settings. For the communication settings 127, 128 and 129, ICMP and TCP are set as the protocols. The information for these protocols are also input as the attributes information by right-clicking the communication setting indicated by an arrow in the network diagram and opening the window 54 of the property setting.

Figure 7:
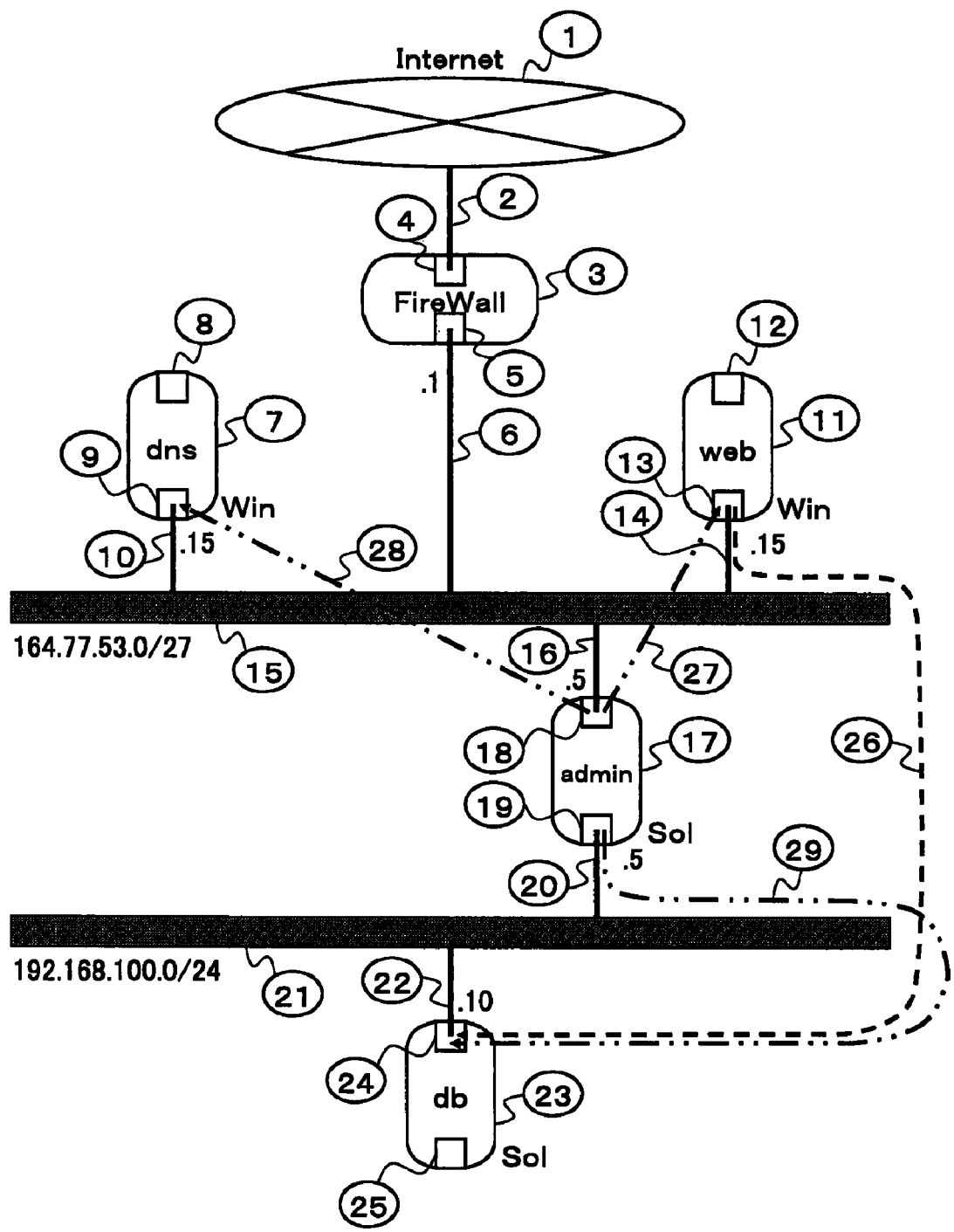
FIG. 7 is a diagram illustrating an example of each object ID given to each component.

FIG. 7 is a diagram illustrating an example of each object ID given to each component. Each component of the graphic elements included in the network diagram is automatically given an object ID by the network diagram creation processing unit 10. The object ID uniquely identifies each component. In FIG. 7, each numeral in ellipse represents the object ID which is given to the component. The object ID is used in the design data management for the individual components within the network design processing device 1.

Although only one line of service communication settings and three lines of maintenance communication settings are described in the network diagram illustrated in FIG. 6, the actually designed network system would include a huge number of lines of communication settings. Therefore, once these communication settings are displayed on the network diagram at a time, congestion of arrows indicating the communication settings would occur, resulting in the indistinguishable communication settings on the screen.

Thus, the network design processing device 1 is provided a function which enables selection with a simple operation and display of only specific communication settings of these communication settings.

Figure 8A:
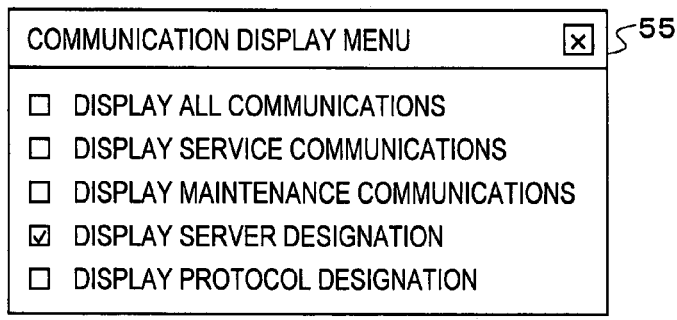
FIGS. 8A and 8B are diagrams illustrating an exemplary selective communication display.
Figure 8B:
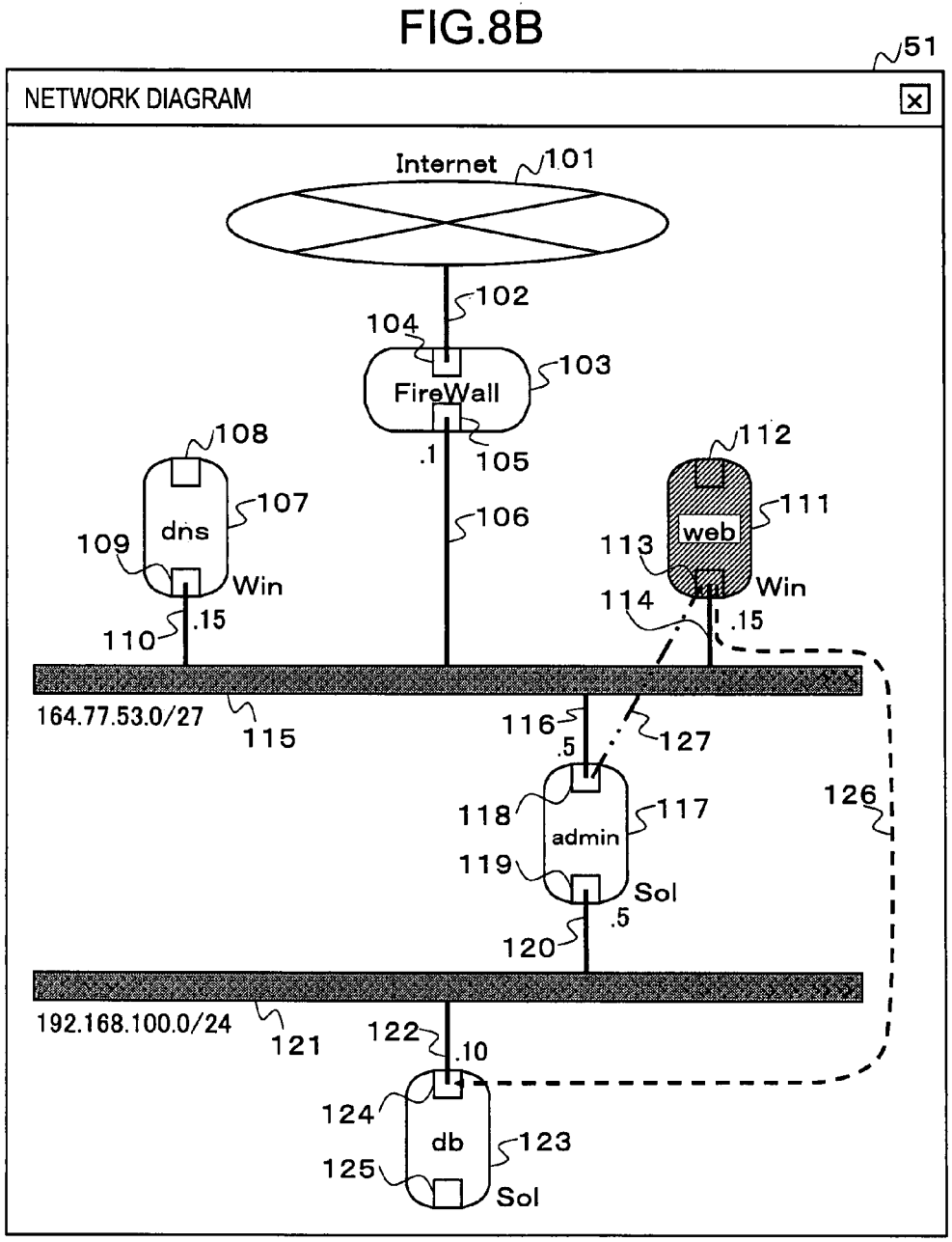

FIGS. 8A and 8B are diagrams illustrating an exemplary selective communication display. FIG. 8A illustrates an example of a window 55 of the communication display menu. In the window 55 of the communication display menu, the designer selects which communication setting is to be displayed on the network diagram. The menu item includes "DISPLAY ALL COMMUNICATIONS", "DISPLAY SERVICE COMMUNICATIONS", "DISPLAY MAINTENANCE COMMUNICATIONS", "DISPLAY SERVER DESIGNATION", "DISPLAY PROTOCOL DESIGNATION" and so on.

The default value is "DISPLAY ALL COMMUNICATIONS", which displays all of the defined communication settings on the network diagram. When "DISPLAY SERVICE COMMUNICATIONS" is selected, then only the service communication settings are selectively displayed on the screen. When "DISPLAY MAINTENANCE COMMUNICATIONS" is selected, then only the maintenance communication settings are selectively displayed on the screen. When "DISPLAY SERVER DESIGNATION" is selected, then on the screen displayed are only the communication settings which have the server selected as the starting point or the ending point by clicking a left button on a mouse. In "DISPLAY SERVER DESIGNATION", it is also possible to select only the starting point or the ending point, or both of the starting point and the ending point. When "DISPLAY PROTOCOL DESIGNATION" is selected, then a protocol designation selection screen is displayed and only the communication settings are selectively displayed on the screen which use the protocol selected from that screen. In this case, although a specific server may be designated with "DISPLAY SERVER DESIGNATION", a specific network device may also be designated instead of servers.

A plurality of these menu items may be selected at a time. When more than one item is selected at a time, the appropriate communication settings would be selected in AND condition and displayed on the screen. For example, when "DISPLAY SERVICE COMMUNICATIONS" and "DISPLAY PROTOCOL DESIGNATION" are selected, and when TCP is selected as the protocol, then only those of the service communication settings, which use TCP protocol, would be selectively displayed on the screen.

In the example in FIG. 8A, "DISPLAY SERVER DESIGNATION" is selected. Then, when the designer selects the web server 111 as the designation server by the designer through mouse click, the selective communication display control unit 11 instructs the network diagram creation processing unit 10 to display only the communication settings in which the web server 111 is set as the starting point or the ending point of the input/output on the network diagram. Consequently, as illustrated in FIG. 8B, the network diagram creation processing unit 10 selects and displays only the communication settings in which the web server 111 is set as the starting point or the ending point of the input/output on the network diagram, while hiding other communication settings.

Since a significant amount of communications are involved in providing actual services, when all of the communication settings are displayed on the network diagram at once, a large number of design mistakes could occur due to the oversight and so on. Therefore, displaying only the communications related to the device selected as stated above, only the incoming communications to the selected device, or only the outgoing communications from the selected device enables clearer sight of the network diagram and reduction of setting errors made by the designer.

In order to achieve such selective display of communication settings in a prompt and simple way, the network diagram creation processing unit 10 includes a layer designation/display function and a function for automatically generating layers and automatically placing objects on the layers.

For a specific description, fixed layers are prepared for each communication protocol and for each communication type as needed, which layers are registered to the appropriate communication protocol and communication type layers when inserting the communication settings into the diagram. Further, one or two dynamic layers are prepared.

Upon receipt of the instruction to display some of the communication settings, the network diagram creation processing unit 10 uses the above-mentioned layers for providing display as follows.

A) When the condition does not include inputting/outputting to a specific server, then the network diagram creation processing unit 10 displays a plurality of fixed layers which meet the instructed condition in "OR" condition.

B) When the condition includes inputting/outputting to a specific server, then, firstly, the network diagram creation processing unit 10 selects a communication setting, which meets the condition, from those having that server as the starting point/the ending point, and registers the communication setting to the non-displayed dynamic layer. Secondly, the network diagram creation processing unit 10 displays the processed dynamic layer with all of the currently displayed layers hidden.

The reason for preparing the fixed layers is that it could lead to the delay of operation to check all of the communication settings in the network diagram at each display time. On the other hand, the reason for preparing the dynamic layers is that it could result in the increase in number of layers used with a large number of servers to display the communication settings focusing on a specific server using the fixed layers. Additionally, provided that a communication setting is displayed focusing on a specific server, the operation delay would not occur even if the appropriate communication settings were checked in each case. Since the number of servers to be focused would be relatively small.

Figure 9:
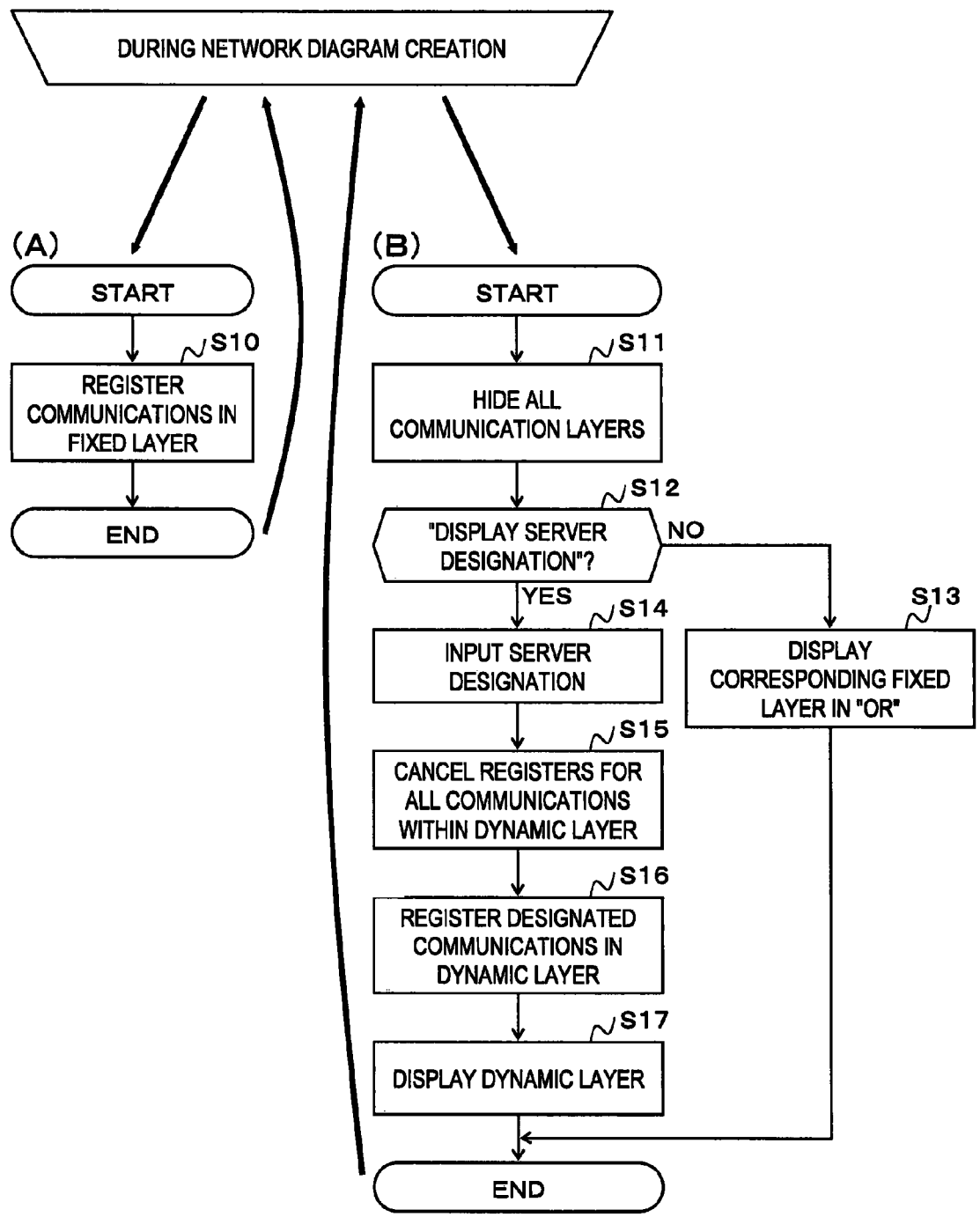
FIG. 9 is a flowchart of a selective communication display process.

FIG. 9 is a flowchart of a selective communication display process. The communication settings made by the designer is registered in the fixed layer. When a server is designated in the selective communication display, the appropriate communication setting is registered in the dynamic layer.

Part (A) of FIG. 9 is a flowchart of the communication settings register processing to the fixed layer. When the designer performs the communication setting being performed by the designer during the creation of the network diagram, the network diagram creation processing unit 10 registers the input communication settings to the fixed layers of the communication protocol and the communication type corresponding to the set communications in step S10, and inserts the communications into the network diagram.

For example, when the communication protocols have three types of TCP, UDP and ICMP, and the communication types have two types of the service communications and the maintenance communications, six fixed layers (2*3=6) are prepared. At this moment, for example, when the communication setting 126 of FIG. 6 is set to the network diagram, the communication setting 126 is registered to the fixed layer with TCP as the communication protocol and the service communications as the communication type.

Part (B) of FIG. 9 is a flowchart of the selective communication display process. When the selective communication display control unit 11 receives a selective communication display instruction by the designer, the network diagram creation processing unit 10 hides all of the communication layers being displayed on the network diagram in step S11. A determination is made as to whether the selective communication display request from the designer is "DISPLAY SERVER DESIGNATION" in step S12. As a result, when it is determined that the request is not "DISPLAY SERVER DESIGNATION", then all of the fixed layers are selected which are corresponding to the designation in the request from the designer for the selective communication display and displayed on the network diagram in "OR" in step S13, and the process terminates.

In the step S12, when the request from the designer for the selective communication display is determined to be "DISPLAY SERVER DESIGNATION", the designation of the server by the designer is input in step S14. The registration for all of the communication settings in the dynamic layer is canceled in step S15. The communication settings for the designation server are registered to the dynamic layer in step S16. The dynamic layer is displayed on the network diagram in step S17, and the process terminates.

For example, as illustrated in FIG. 8B, when the web server 111 is designated as the designation server, the communication settings 126 and 127, which are the communication settings for the web server 111, are registered to the dynamic layer and displayed on the network diagram.

Figure 10:
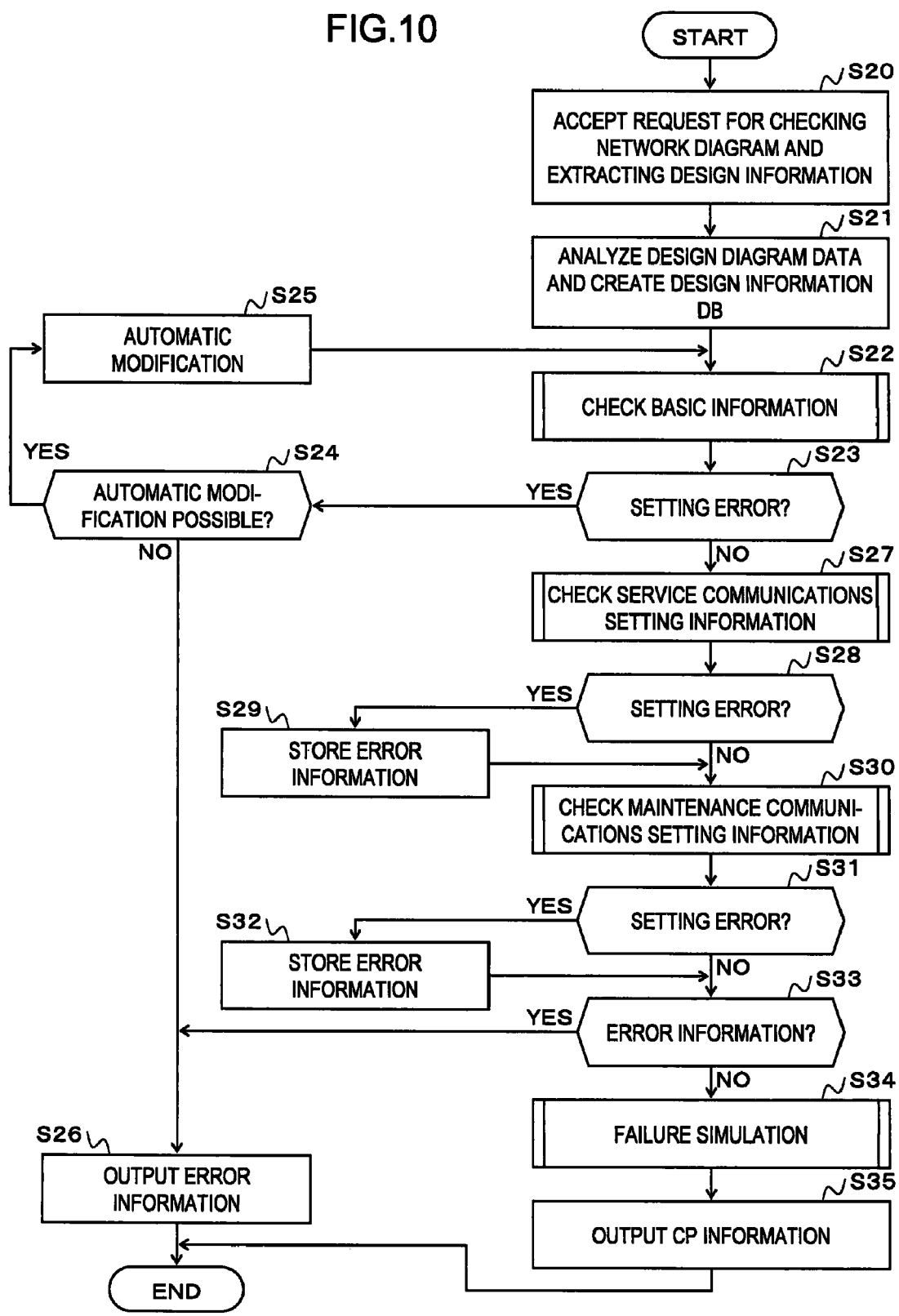
FIG. 10 is a flowchart of a check process on a network diagram.

FIG. 10 is a flowchart of a check process on the network diagram in accordance with this embodiment. The network diagram, which is created by the network diagram creation processing unit 10, is processed by the network design processing device 1 as follows.

When the design diagram data analysis unit 13 receives the request for checking the network diagram and extracting the design information from the designer in step S20, the design diagram data analysis unit 13 analyzes the design diagram data of the network diagram which is saved in the design diagram data storage unit 12, and extracts the design information necessary for the network management. The extracted design information is stored in the design information DB 14 in a predetermined format, which manages the information for each network device including the configuration information and the connection information in step S21.

The design information check is performed in three steps as described below, namely, the basic information check for the configuration of the individual devices, the service communication setting information check for the service communication settings, and the maintenance communication setting information check for the maintenance communication settings.

The basic information check unit 15 performs the basic information check process on the design information stored in the design information DB 14 in step S22, and checks for any setting error in the basic information in step S23. The basic information check performed by the basic information check unit 15 is a common technique which has been conventionally employed in the network design support system, for example, for checking the configuration and connection of the devices. In this technique, for example, those situations are detected as "SETTING ERROR EXISTS" where a device exists which is not connected to the network, or the same IP addresses are assigned to a plurality of devices. When a setting error exists in the basic information, it is determined whether the setting error can be modified automatically in step S24. When the setting error can be modified automatically, the design information modification unit 17 performs the automatic modification process on the setting error in step S25, and the process returns to the basic information check process of the step S22. The automatic modification is performed in such a way that when the same IP addresses are assigned to a plurality of devices, one of the IP addresses is automatically changed to a non-assigned IP address. The result of the automatic modification is acknowledged by the designer and then written to the design information DB 14.

When the automatic modification is impossible, then the error information output processing is performed in step S26, and the process terminates.

In step S23, when no setting error exists in the basic information, the communication setting information check unit 16 performs the service communication setting information check process on the design information which is stored in the design information DB 14 in step S27, and checks for any setting error in the service communication setting information in step S28. When a setting error exists in the service communication setting information, the error information indicating the setting error is stored in step S29.

The communication setting information check unit 16 further performs the maintenance communication setting information check process on the design information which is stored in the design information DB 14 in step S30, and checks for any setting error in the maintenance communication setting information in step S31. When a setting error exists in the maintenance communication setting information, the error information indicating the setting error is stored in step S32.

The communication setting information check unit 16 determines whether the error information exists which indicates the setting error in the service communication setting information or the maintenance communication setting information in step S33. When the error information exists, the communication setting information check unit 16 performs the error information output process in step S26, and the process terminates.

When no setting error exists in all of the basic information, the service communication setting information, and the maintenance communication setting information, then the failure simulation unit 19 performs the CP extraction process based on the failure simulation for extracting a critical point in step S34. The CP information output unit 20 performs the CP information output process for outputting the critical point information which is obtained from the CP extraction process in step S35, and the process terminates.

FIG. 11 illustrates an example of a device table to be stored in the design information DB 14. FIG. 12 illustrates an example of a connection information table to be stored in the design information DB 14. FIG. 13 illustrates an example of a session table to be stored in the design information DB 14.

In step S21 described above, the device table 56 of FIG. 11 and the communication information table 57 of FIG. 12 are created by the basic information extraction unit 21 illustrated in FIG. 2 from the design diagram data of the network diagram which is stored in the design diagram data storage unit 12, and then stored in the design information DB 14. Additionally, the session table 58 of FIG. 13 is created by the communication setting information extraction unit 22 illustrated in FIG. 2, and then stored in the design information DB 14.

The object IDs in the device table 56, the communication information table 57, and the session table 58 represent identifiers for uniquely identifying each device or communications placed in the network diagram. These object IDs in each table correspond to the object IDs illustrated in FIG. 7, which were automatically given by the network diagram creation processing unit 10.

Each name in the device table 56 represents a name which is given to that device. Any name may be set as long as the name can be recognized by the designer or operator of the network system. Each type represents information for the type of that device. Each address represents an IP address which is set for that device.

Each child object ID and each parent object ID represent each object ID for a device which has a parent-child relationship with the device in question. For example, a dns server 107 with an object ID "7" contains a NIC 108 with an object ID "8" and a NIC 109 with an object ID "9". Therefore, "8" and "9" are set as the child object ID of the dns server 107 with the object ID "7". On the other hand, "7" is set as the parent object ID of the NIC 108 with the object ID "8" and the NIC 109 with the object ID "9".

These kinds of information are mainly extracted from the attributes information which is set as a property for each device, or obtained by analyzing the hierarchical structure of a group (for example, grouped objects as server itself+NIC+NIC) of components (for example, a server itself, a NIC and so on) which represent each device.

When an error exists for the device setting, such error information is inserted in the status information. Additionally, the status information is used in the CP extraction process by the failure simulation unit 19. When a pseudo-failure is caused for a device, the failure simulation unit 19 sets the pseudo-failure status for the status information of the device.

The object IDs in the communication information table 57 of FIG. 12 represent identifiers for uniquely identifying each connection cable placed in the network diagram. The object Ids correspond to the object IDs illustrated in FIG. 7 as described above. Each type represents information for the type of the cable. Each end-point object ID represents an object ID for each device that corresponds to the opposite ends of the connection cable.

When an error exists for the connection cable setting, such error information is inserted in the status information. Additionally, the status information is used in the CP extraction process by the failure simulation unit 19. When a pseudo-failure is caused for a connection cable, the failure simulation unit 19 sets the pseudo-failure status for the status information of the connection cable.

The object IDs in the session table 58 of FIG. 13 represent identifiers for uniquely identifying the set communications, which correspond to the object IDs illustrated in FIG. 7 as described above. Each type represents the information which indicates whether the communications are the service communications or the maintenance communications.

Each protocol represent a protocol which is used in the communications. When a plurality of protocols is set for a single communication, a plurality of record is generated on the session table 58. For example, since the two types of protocols, namely, TCP and ICMP are set in the communication setting 127, the communication setting 128 and the communication setting 129, with respect to each communication setting with the object IDs "27", "28" and "29", two records of each setting are generated in the session table 58 of FIG. 13.

The starting point ID and the ending point ID represent the object IDs for the devices which are corresponding to the starting points or the ending points of their communications. For example, since the communication setting 126 with an object ID "26" corresponds to the NIC 113 which has the web server 111 as the starting point and to the NIC 124 which has the db server 123 as the ending point, an object ID "13" of the NIC 113 is set as the starting point ID, and an object ID "24" of the NIC 124 is set as the ending point ID.

Other information includes, for example, more specific settings for the protocol used in the communications. For example, when the protocol is TCP, then, the source port number and the destination port number and so on will be set. When an error exists for the communication setting, such error information is inserted in the status information.

Figure 14:
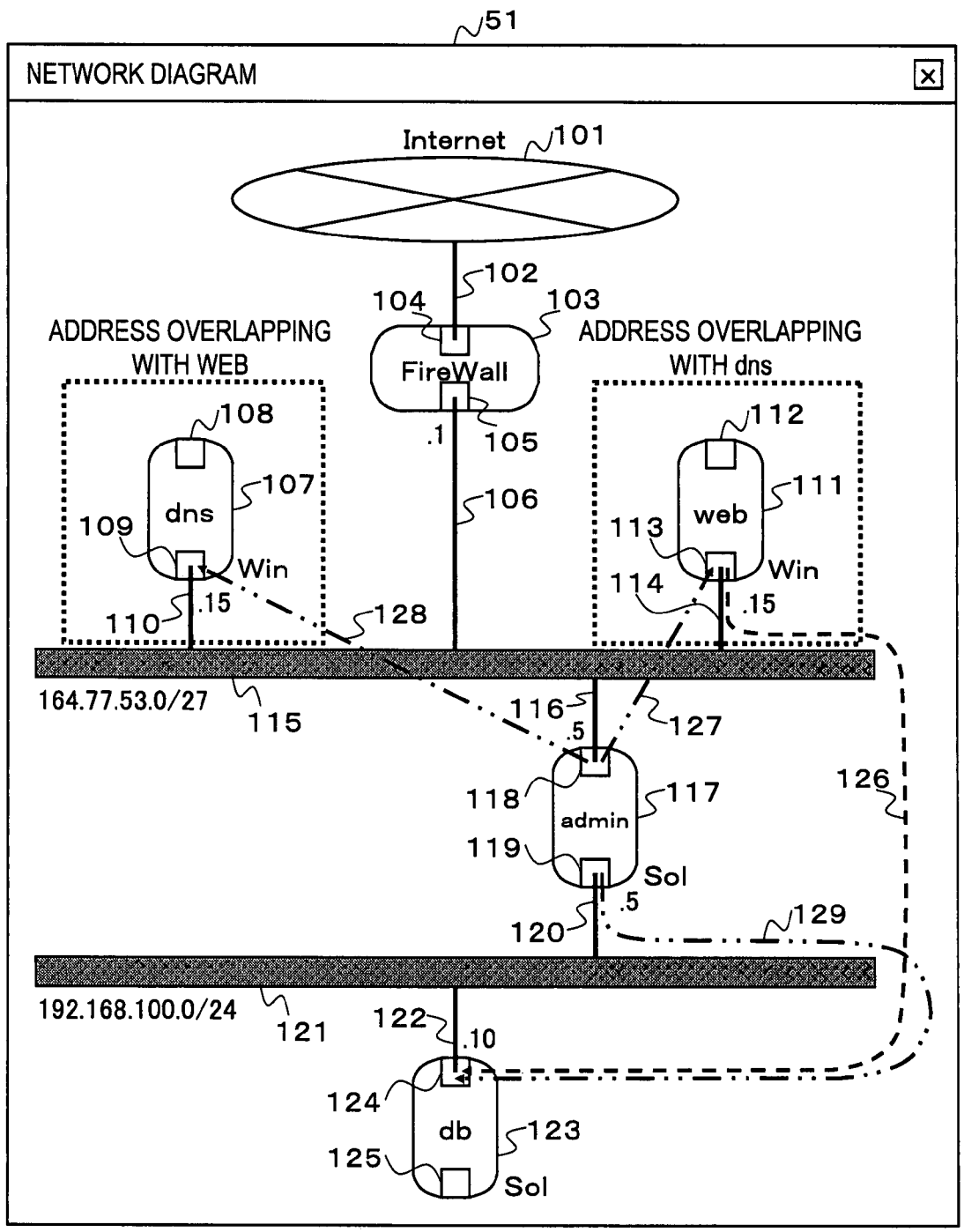
FIG. 14 is a chart illustrating an example of a basic information check result.

FIG. 14 illustrates an exemplary basic information check result. When the basic information check unit 15 finds a setting error in the basic information of the design information DB 14, then the check result output unit 18 outputs the error information on the network diagram.

As can be seen from the device table 56 of FIG. 11, in the network diagram of FIG. 6, the addresses for the dns server 107 and the web server 111 are set in an overlapping fashion. Consequently, a setting error is detected at the basic information check process. At this moment, as illustrated in FIG. 14, an error object is inserted on the network diagram, indicating that the addresses for the dns server 107 and the web server 111 are overlapping. In the example illustrated in FIG. 14, the error object is displayed in the form of a dotted frame and error massages indicating the appropriate portions.

Figure 15:
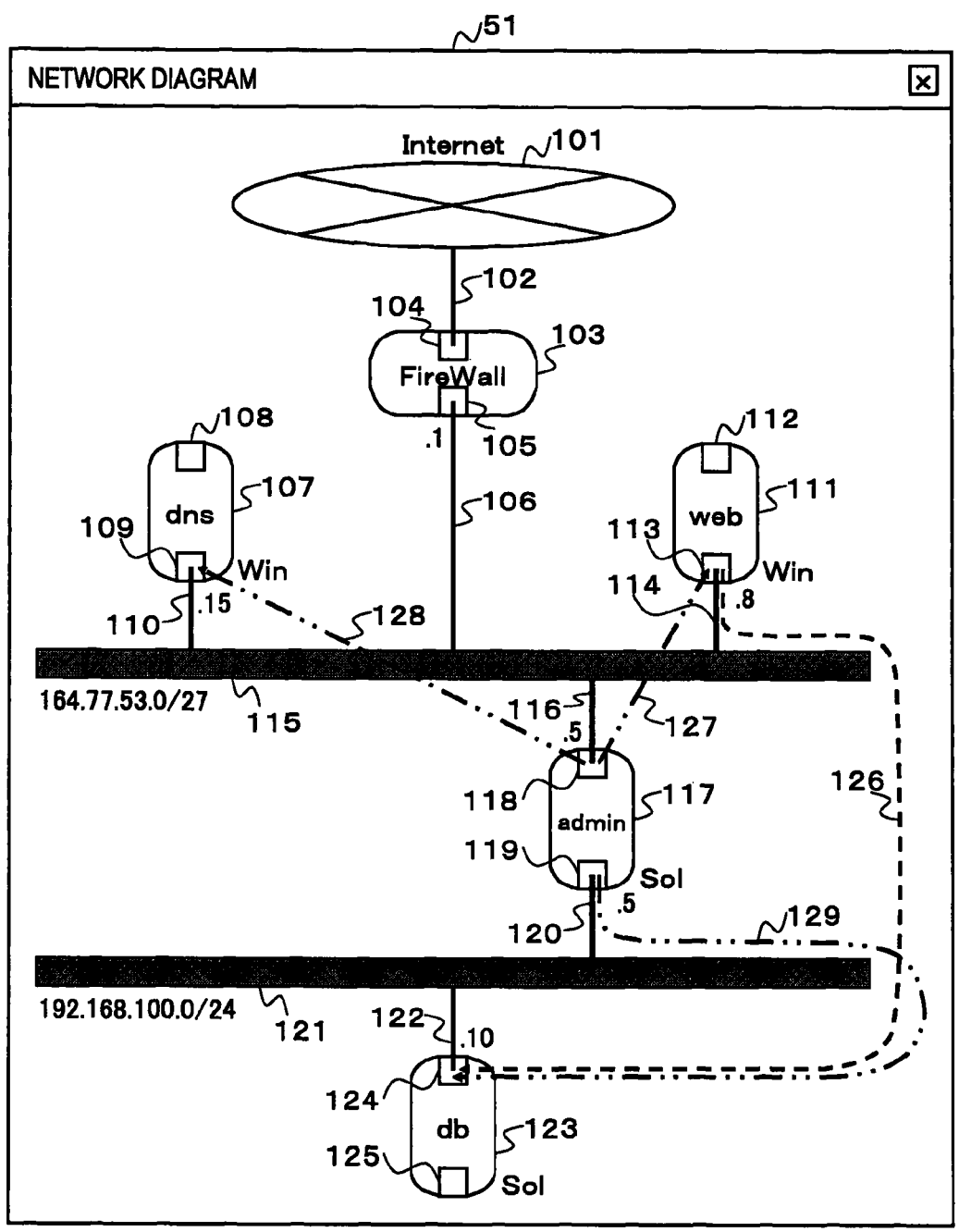
FIG. 15 is a chart illustrating an example of a network diagram after address modification.

FIG. 15 illustrates an exemplary network diagram after address modification. In this case, the lower five bits of the address for the NIC 113 on the web server 111 are modified from "0.15" to "0.8". This eliminates all setting errors due to the address overlapping.

This address modification may be performed by the designer through the property setting of the NIC 113 from the network diagram. If possible, setting errors may be automatically modified by the design information modification unit 17. For example, since the range of IP addresses which can be easily set may be known from the network address of the network to which the device is connected, for example, the setting error due to the address overlapping as described above may also be automatically modified by the design information modification unit 17. When the automatic modification is possible, the process may proceed to the next process without prompting the designer a setting error modification. This enables reduction of person-hours for the design by the designer.

Figure 16:
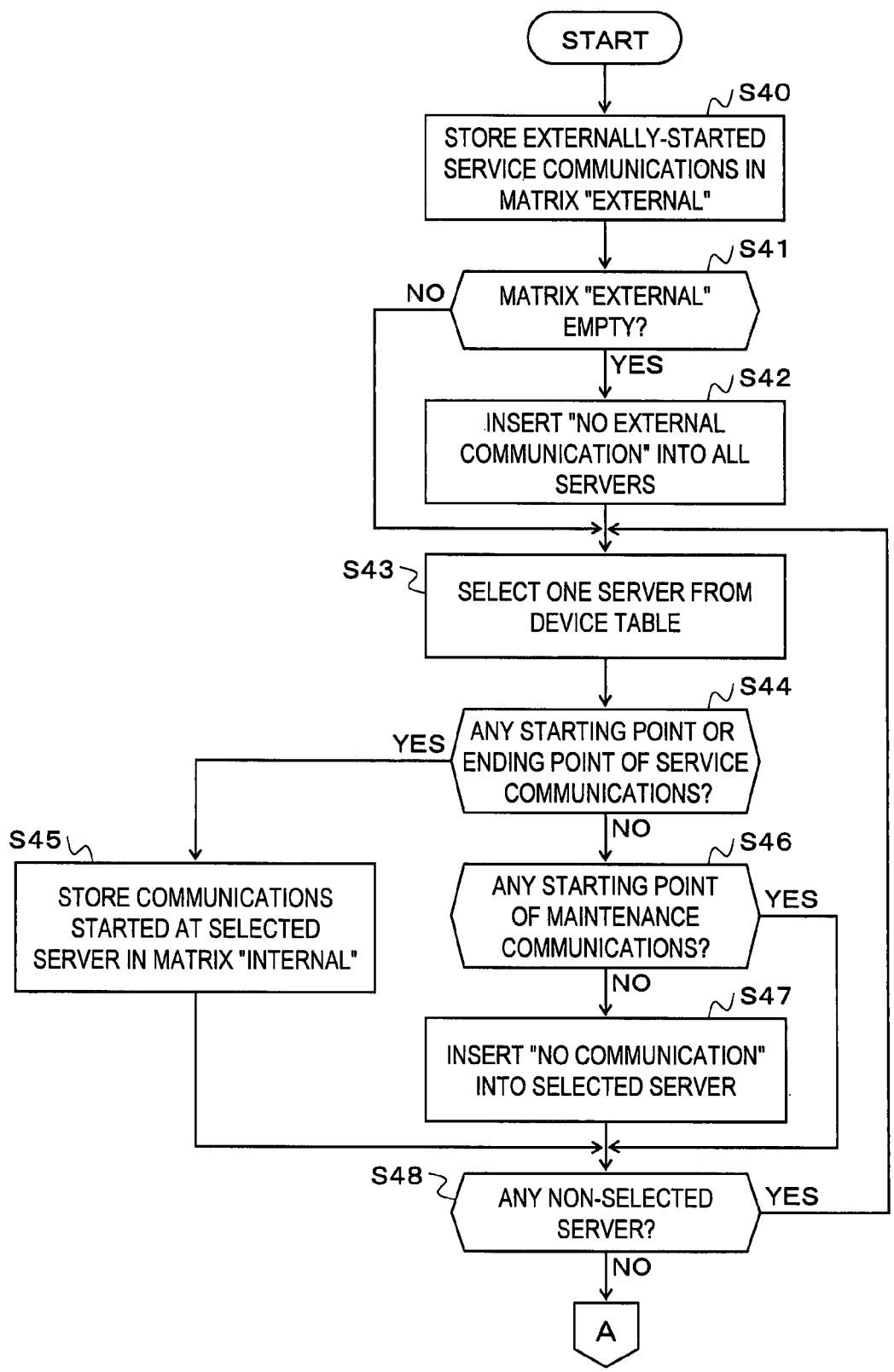
FIG. 16 is a flowchart of a service communication setting check process.
Figure 17:
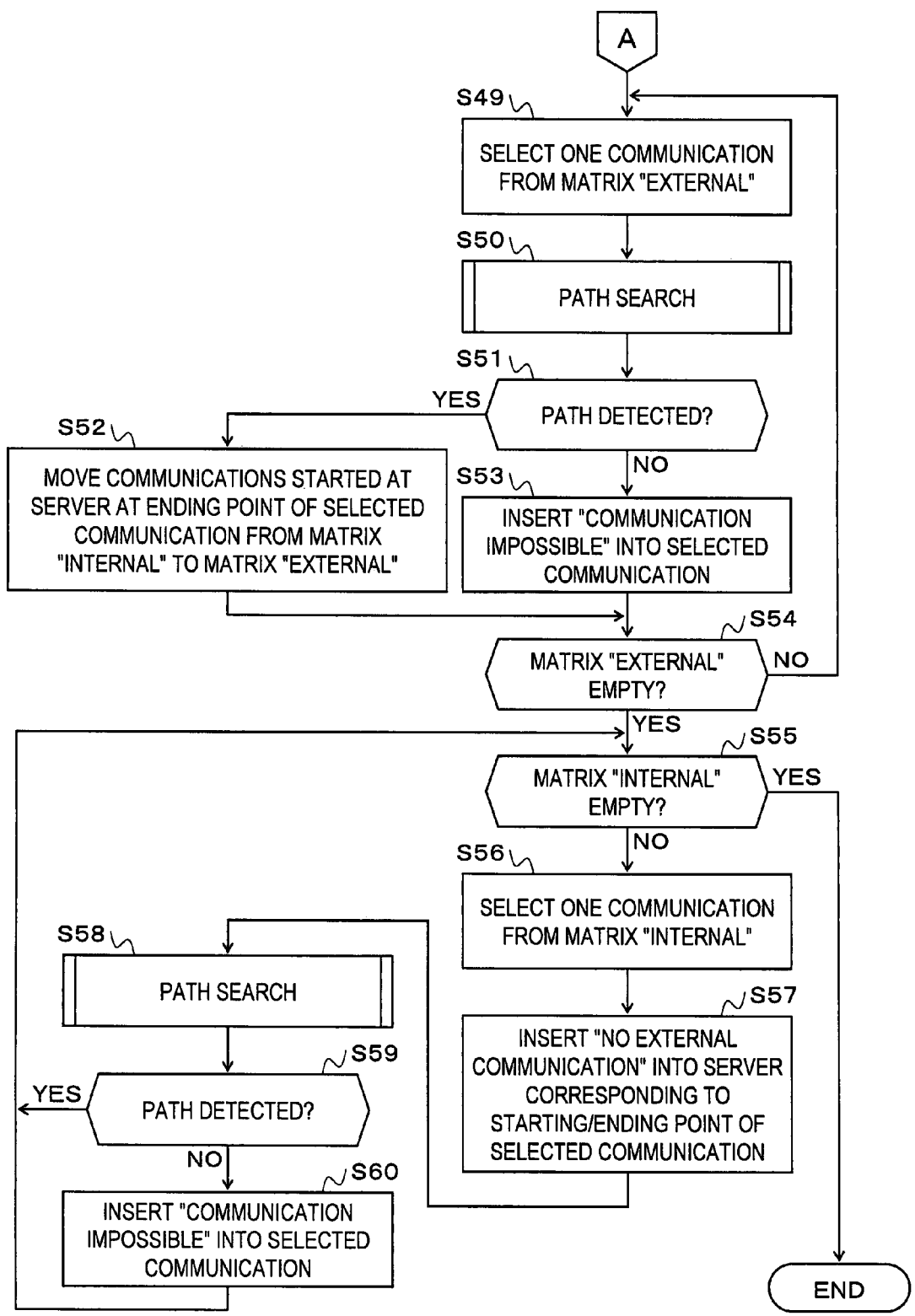
FIG. 17 is a flowchart of a service communication setting check process.

FIGS. 16 and 17 are flowcharts of a service communication setting check process according to the embodiment of the present invention. The service communication setting check unit 23 checks whether or not the service communications are possible for the service communication settings in the session table 58 with reference to the device table 56 and the communication information table 57. Additionally, for example, the service communication setting check unit 23 performs detection for a server which has no communications with the outside world (the Internet 101) or the other internal servers.

First, the service communication setting check unit 23 stores service communications in which an external device is the starting point of the service, in a matrix "EXTERNAL" in step S40. The service communication setting check unit 23 determines whether the matrix "EXTERNAL" is empty in step S41. When the matrix "EXTERNAL" is empty, an error object of "NO EXTERNAL COMMUNICATION" is inserted into all servers in step S42.

Then, the service communication setting check unit 23 selects one server from the device table 56 in step S43, and determines whether the selected server has the starting point or the ending point of the service communications in step S44. When the selected server has the starting point or the ending point of the service communications, the communications in which the selected server is set as the starting point is stored in a matrix "INTERNAL" in step S45.

When the server selected in step S44 does not have the starting point or the ending point of the service communications, then the service communication setting check unit 23 determines whether the selected server has the starting point of the maintenance communications in step S46. When the selected server does not have the starting point of the maintenance communications, an error object of "NO COMMUNICATION" is inserted into the selected server in step S47.

The service communication setting check unit 23 determines whether a non-selected server exists in the device table 56 in step S48. When a non-selected server exists, the process returns to the process of step S43. Thereafter, the processes of steps S43 through S48 are repeated until there does not exist a non-selected server in the device table 56.

When there does not exist a non-selected server in the device table 56, the service communication setting check unit 23 selects one communication from the matrix "EXTERNAL" in step S49. The path search unit 25 performs a path search process with respect to the selected communications in step S50, and the service communication setting check unit 23 determines whether a path is detected in step S51. The path search unit 25 is to perform a process to detect the presence of a communication route capable of the selected communication, and the detail of the process will be described below.

When a path is detected, the communications in which a server at the ending point of the selected communication is set as the starting point is moved from the matrix "INTERNAL" to the matrix "EXTERNAL" in step S52. When the pass is not detected, an error object of "COMMUNICATION IMPOSSIBLE" is inserted into the selected communication in step S53.

A determination is made as to whether the matrix "EXTERNAL" is empty in step S54. When the matrix "EXTERNAL" is not empty, the process returns to the process of the step S49. Thereafter, the processes of steps S49 through S54 are repeated until the matrix "EXTERNAL" becomes empty.

When the matrix "EXTERNAL" becomes empty, then the service communication setting check unit 23 determines whether the matrix "INTERNAL" is empty in step S55. When the matrix "INTERNAL" is not empty, the service communication setting check unit 23 selects one communication from the matrix "INTERNAL" in step S56. An error object of "NO EXTERNAL COMMUNICATION" is inserted into the servers which are corresponding to the starting point and the ending point of the selected communication, respectively in step S57.

Additionally, the path search unit 25 performs the path search process with respect to the selected communication in step S58, and the service communication setting check unit 23 determines whether a path is detected in step S59. When a path is not detected, the service communication setting check unit 23 inserts an error object of "COMMUNICATION IMPOSSIBLE" into the selected communication in step S60.

The process of steps S55 through S60 are repeated until the matrix "INTERNAL" becomes empty, and the process terminates when the matrix becomes empty.

Figure 18:
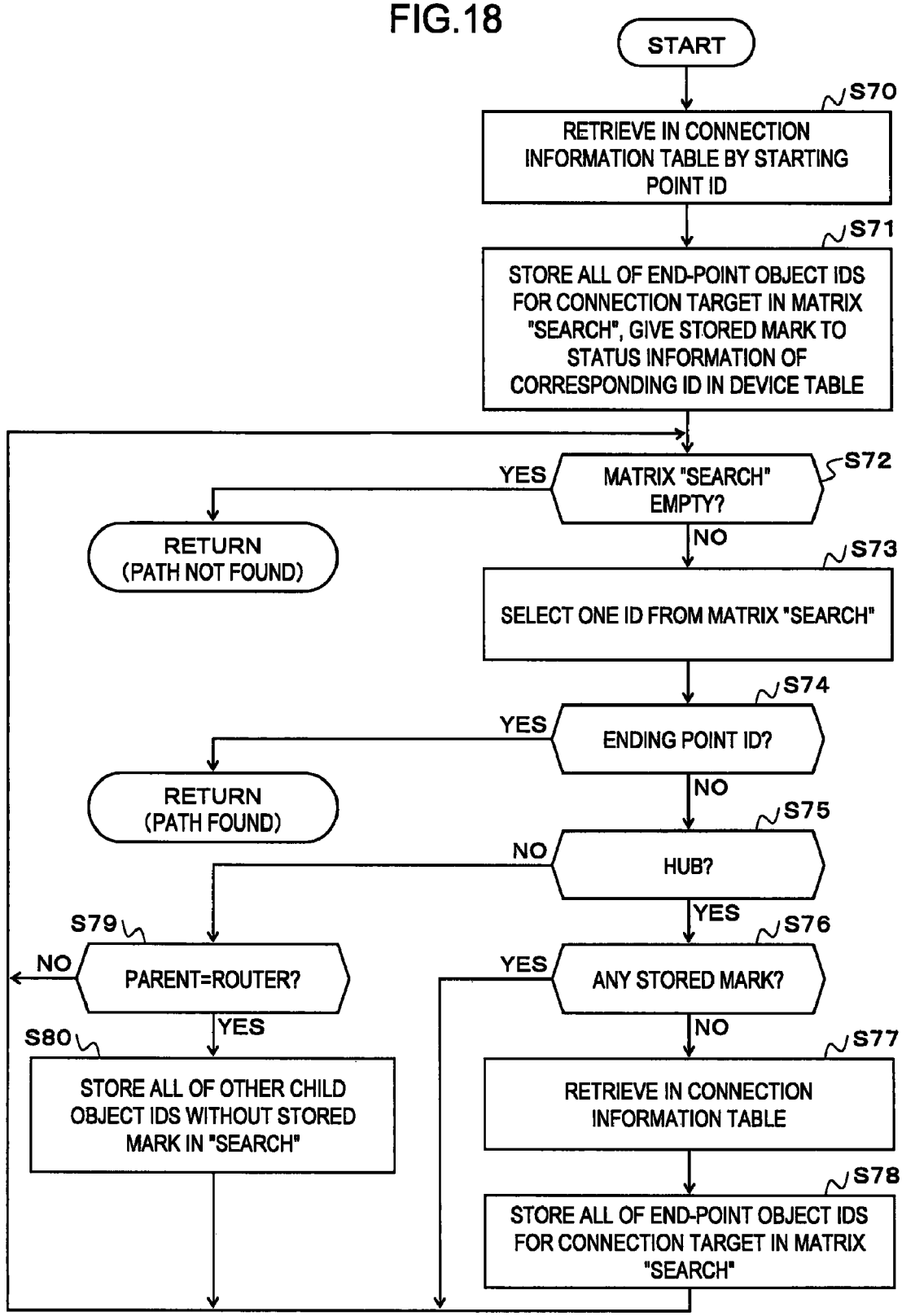
FIG. 18 is a flowchart of a path search process.

FIG. 18 is a flowchart of a path search process according to the embodiment of the present invention. The path search process by the path search unit 25 takes the starting point ID and the ending point ID of the communication setting as input, and the presence or absence of paths (communication routes) as output.

The path search unit 25 retrieves an end-point object ID in the communication information table 57 by the starting point ID of the designated communications in step S70, and obtains the end-point object ID of a connection target. All of the end-point object IDs of the connection target, which are obtained from the retrieval, are stored in a matrix "SEARCH", while giving a "stored" mark to the status information section of the appropriate object in the device table 56 in step S71. For example, since the communication setting 126 with an object ID "26" in the session table 58 of FIG. 13 has the starting point ID "13", when an end-point object ID is retrieved in the communication information table 57 by the starting point ID, there will be obtained "15" as the end-point object ID of the connection target.

A determination is made as to whether the matrix "SEARCH" is empty in step S72. When the matrix "SEARCH" is empty, a return code of "PATH NOT FOUND" is returned to the source node from which the search request was sent, and the process terminates.

When the matrix "SEARCH" is not empty in step S72, one ID is selected from the matrix "SEARCH" in step S73. A determination is made as to whether the selected ID is the ending point ID in step S74. When the selected ID is the ending point ID, a return code of "PATH FOUND" is returned to the source node from which the search request was sent, and the process terminates.

When the selected ID is not the ending point ID in step S74, a determination is made as to whether the ID is a Hub ID in the device table 56 in step S75. When the selected ID is the Hub ID, a determination is made as to whether the object has a "stored" mark in the device table 56 in step S76. When the object has a "stored" mark, the process returns to the process of step S72. When the object does not have a "stored" mark, an end-point object ID of the communication information table 57 is retrieved by the ID in step S77, and the end-point object ID of the connection target is obtained. All of the end-point object IDs of the connection target, which are obtained from the retrieval, are stored in the matrix "SEARCH" in step S78, and the process returns to the process of the step S72.

When the selected ID is not the Hub ID in the step S75, a determination is made as to whether a device corresponding to a parent of another device which has the Hub ID as its object ID is a Router in the device table 56 in step S79. When a device corresponding to a parent of another device which has the Hub ID as its object ID is a Router, all of the other child object IDs of the Router, which have not yet been given a "stored" mark, are obtained from the device table 56, and these IDs are stored in the matrix "SEARCH" in step S80. Then the process returns to the process of the step S72.

Figure 19:
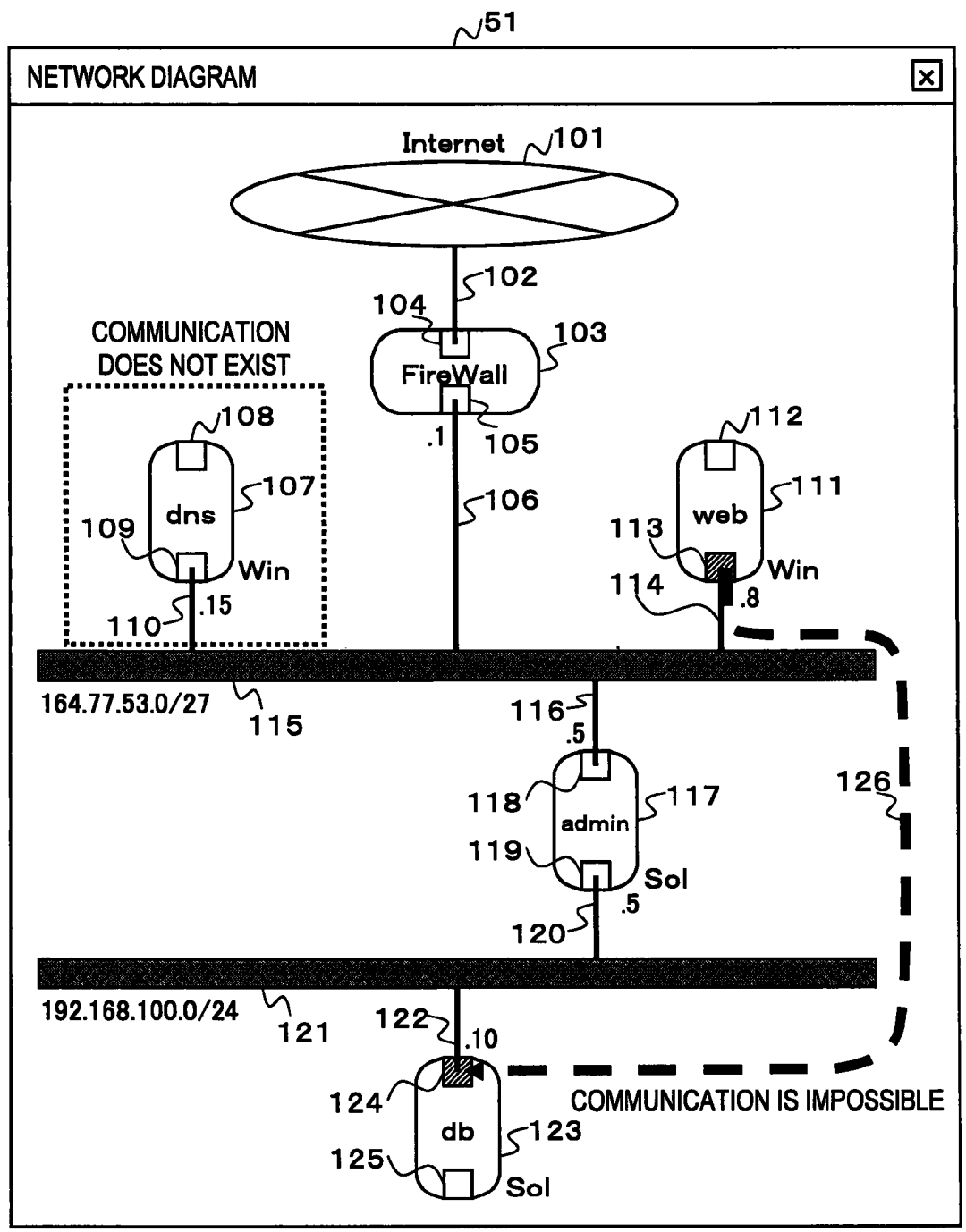
FIG. 19 is an example of service communication setting check result.

FIG. 19 illustrates an example of a service communication setting check result. When the service communication setting check unit 23 found a setting error in the service communication setting in the design information DB 14, then the check result output unit 18 outputs such error information on the network diagram.

As illustrated in the network diagram of FIG. 19, since there is no device for Routing between the Global-net and the Private-net, the communications between the web server 111 and the db server 123 is impossible. In this respect, the admin server 117 is a maintenance server, which has no routing function for the service communications. Therefore, a setting error is detected at the service communication setting check process, and an error object is inserted on the network diagram indicating that the communications is impossible between the web server 111 and the db server 123.

Additionally, as illustrated in the network diagram of FIG. 19, there is no service communications set for the dns server 107. Therefore, a setting error is detected at the service communication setting check process, and the error object is inserted on the network diagram indicating the absence of the service communication setting for the dns server 107.

Although there is no service communication set for the admin server 117, a setting error would not be detected at the service communication setting check process which indicates the absence of the service communication setting, since the admin server 117 would be determined to be a device for maintenance as the admin server 117 corresponds to the starting point of the maintenance communication setting. Such an effect is obtained by managing the service communication setting and the maintenance communication setting in a distinct manner.

Figure 20:
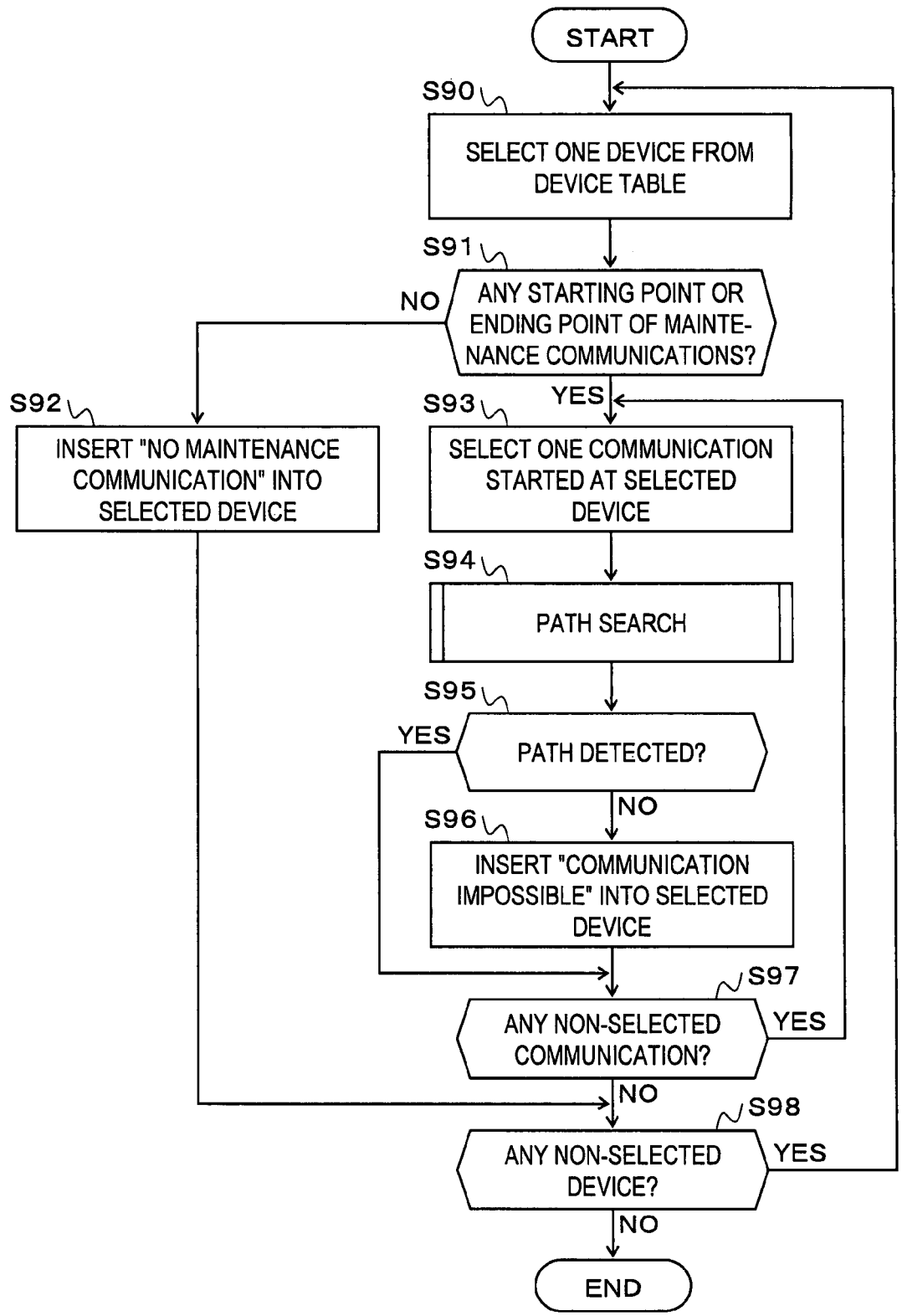
FIG. 20 is a flowchart of a maintenance communication setting check process.

FIG. 20 is a flowchart of a maintenance communication setting check process according to the embodiment of the present invention. The maintenance communication setting check unit 24 selects one device such as a server or a Router from the device table 56 in step S90, and determines whether the selected device has the starting point or the ending point of the maintenance communications in step S91. When the selected device does not have the starting point or the ending point of the maintenance communications, then an error object of "NO MAINTENANCE COMMUNICATION" is inserted into the selected device in step S92.

When the device selected at the step S91 has the starting point or the ending point of the maintenance communications, then one maintenance communication in which the selected device selected as the starting point is selected in step S93. The path search unit 25 performs the path search process with respect to the selected communication in step S94, and the maintenance communication setting check unit 24 determines whether a path is detected in step S95. When the path is not detected, an error object of "COMMUNICATION IMPOSSIBLE" is inserted into the selected device in step S96.

A determination is made as to whether there exists any non-selected maintenance communication in which the selected device is set as the starting point in step S97. When any non-selected maintenance communication exists, the process returns to the process of the step S93. Thereafter, the processes of steps S93 through S97 are repeated until there does not exist a non-selected maintenance communication which has the selected device as the starting point.

When there does not exist non-selected maintenance communication in which the selected device is set as the starting point, a determination is made as to whether there exists a non-selected device in the device table 56 in step S98. When there is a non-selected device, the process returns to the process of the step S90. Thereafter, the processes of steps S90 through S98 are repeated until not being a non-selected device in the device table 56, and the process terminates when there is not a non-selected device in the device table 56.

Figure 21:
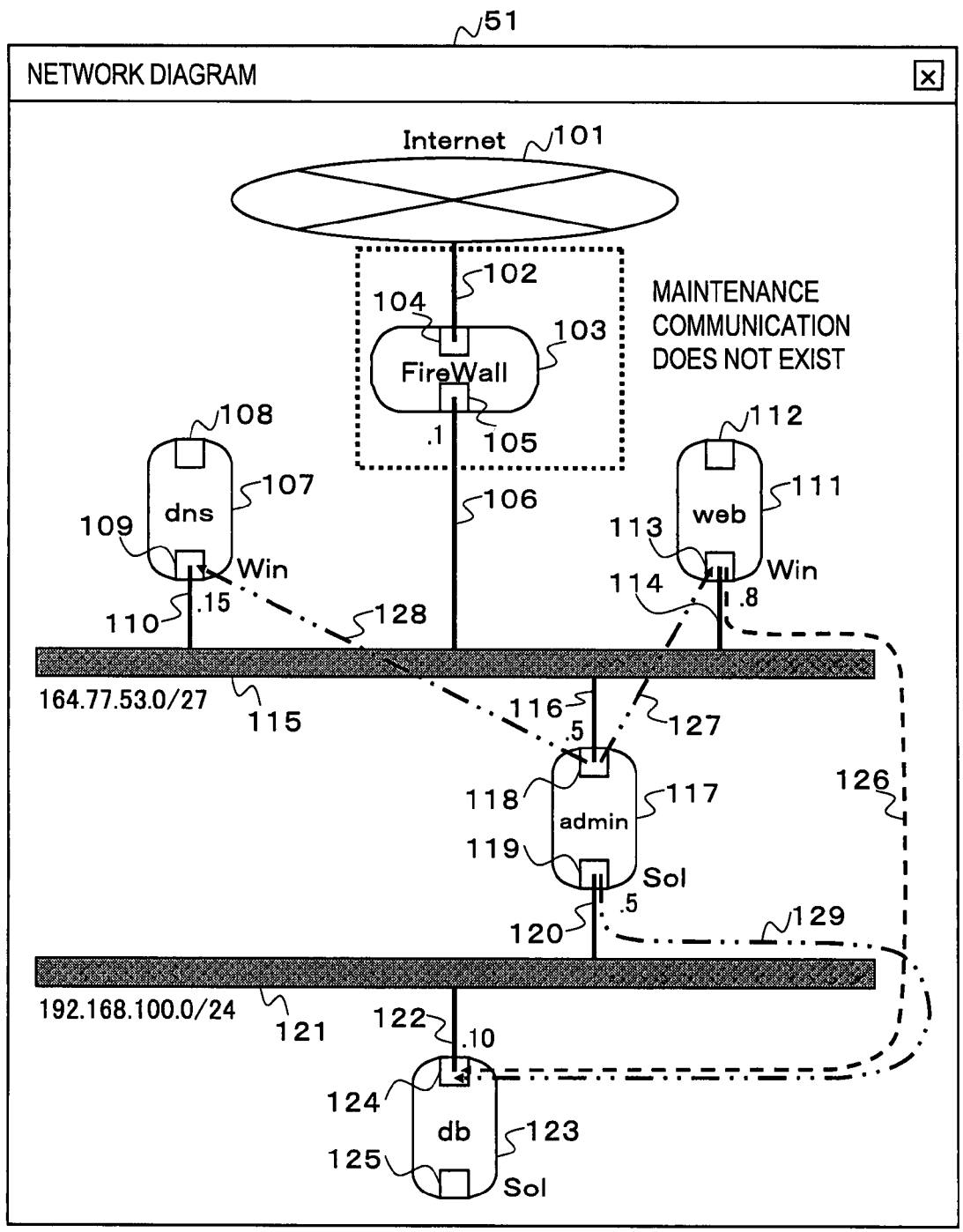
FIG. 21 is a chart illustrating an example of maintenance communication setting check result.

FIG. 21 illustrates an example of maintenance communication setting check result. When the maintenance communication setting check unit 24 finds a setting error in the maintenance communication setting of the design information DB 14, then the check result output unit 18 outputs error information on the network diagram.

As illustrated in the network diagram of FIG. 21, there is no maintenance communication set for the NICs 104 and 105 on the FireWall 103. Therefore, a setting error is detected at the maintenance communication setting check process, and an error object is inserted on the network diagram indicating the absence of the maintenance communication setting for the FireWall 103.

The operational monitoring for a computer system is fundamentally performed on all NICs for all devices which can be monitored. Therefore, when there is a device which provides no communications for the operational monitoring, then a setting error is detected at the maintenance communication setting check process.

Figure 22:
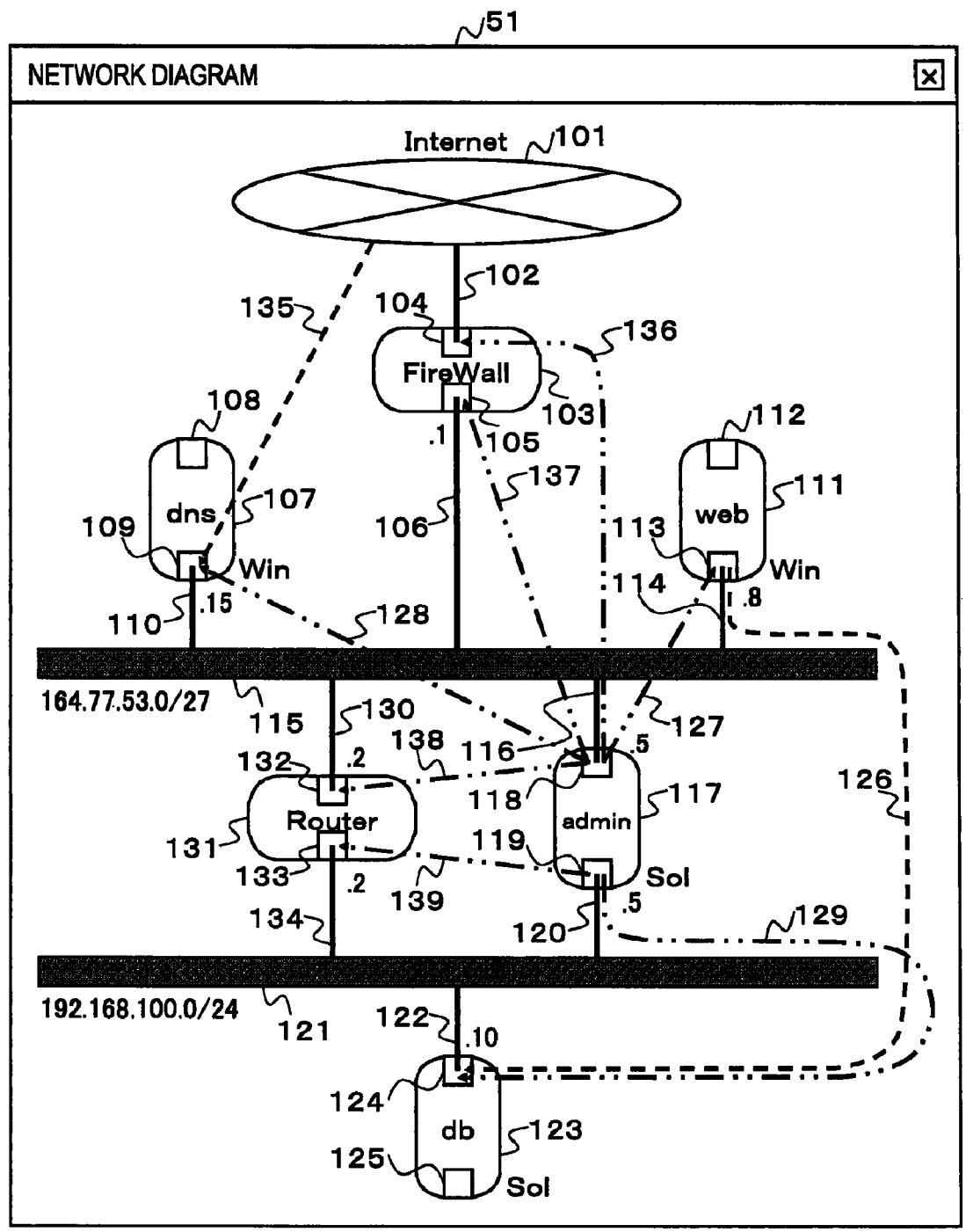
FIG. 22 is a chart illustrating an example of the network diagram after Router placement.

FIG. 22 illustrates an exemplary network diagram after Router placement. This network diagram is created by the designer modifying the setting errors indicated in FIGS. 19 and 20 via the input from the input/output device 2.

First, in order to deal with the setting errors indicating that the communication is impossible between the web server 111 and the db server 123, a Router 131 is provided between the Global-net and the Private-net. A NIC 132 and a Hub 115 on the side of the Global-net are connected via a connection cable 130, while a NIC 133 and a Hub 121 on the side of the Private-net are connected via a connection cable 134. The lower five bits of the address for the NIC 132 on the side of the Global-net are set to "0.2", while the lower eight bits of the address for the NIC 133 on the side of the Private-net are set to "0.2". Due to the presence of the Router 131, the communications would be possible between a device on the side of the Global-net and another device on the side of the Private-net.

Then, in order to deal with the setting errors indicating the absence of the service communication setting for the dns server 107, a service communication setting 135 from the external Internet 101 to the dns server 107 is set on the network diagram.

Additionally, in order to deal with the setting errors indicating the absence of the maintenance communication setting for the FireWall 103, a maintenance communication setting 136 connected from the NIC 118 on the admin server 117 to the NIC 104 on the FireWall 103, and a maintenance communication setting 137 connected from the NIC 118 on the admin server 117 to the NIC 105 on the FireWall 103, are set on the network diagram.

Further, in association with the placement of the Router 131, a maintenance communication setting 138 connected from the NIC 118 on the admin server 117 to the NIC 132 on the Router 131 and a maintenance communication setting 139 connected from the NIC 119 on the admin server 117 to the NIC 133 on the Router 131, are also set on the network diagram.

Figure 23:
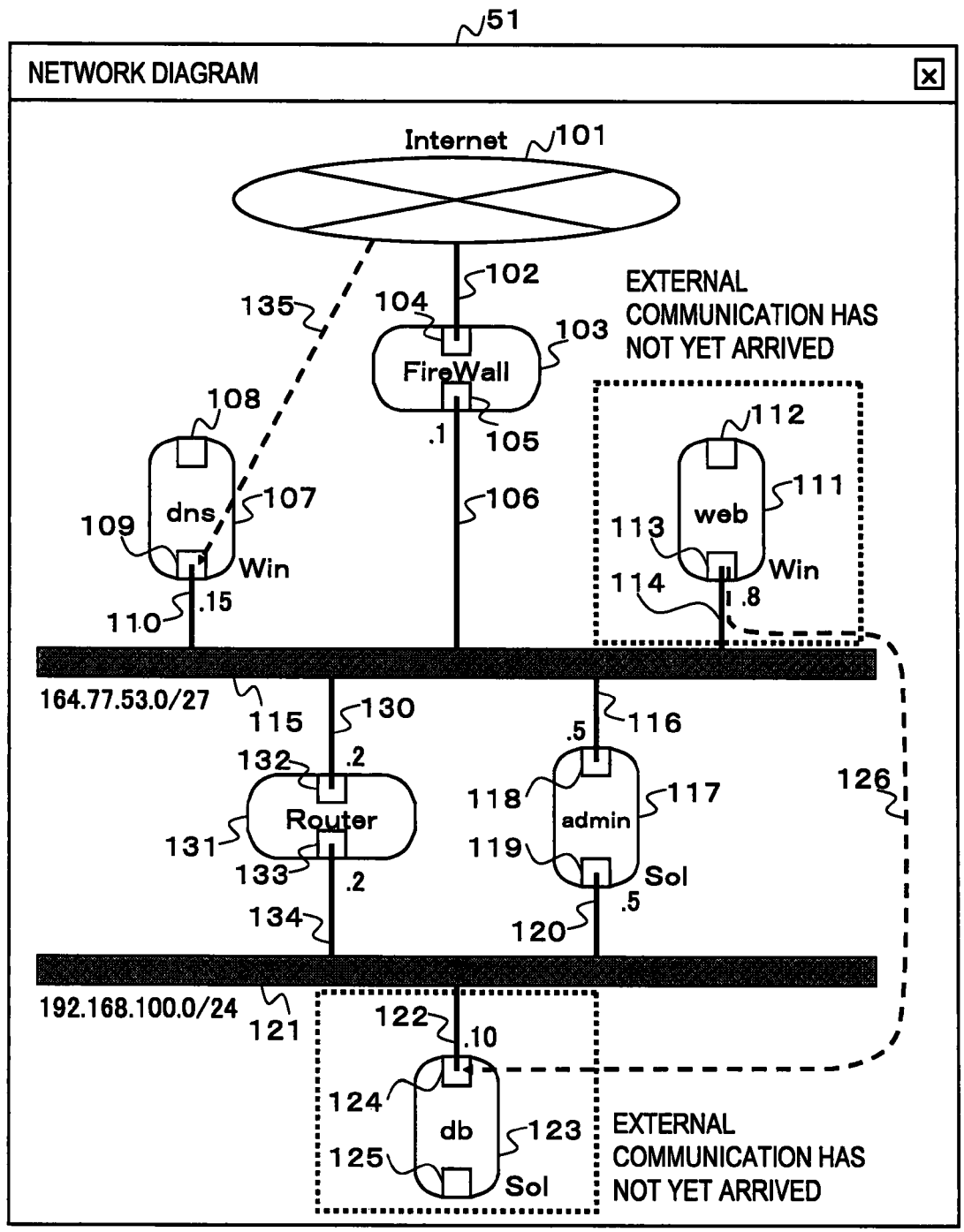
FIG. 23 is a chart illustrating an example of state where a device is detected which is isolated from an external communication.

FIG. 23 illustrates an example of state where a device is detected which is isolated from an external communication. As illustrated in FIG. 23, there exists other error information indicating that an external communication has not arrived by the service communication setting check process, in addition to the error information illustrated in FIGS. 19 and 21.

As illustrated in the network diagram of FIG. 23, although the service communication setting 135 is made from the external Internet 101 to the dns server 107, there is no service communication setting from the outside world for the web server 111. Therefore, a setting error is detected at the service communication setting check process, and an error object, which indicates the absence of the service communication setting for the web server 111 from the outside world, is inserted on the network diagram.

Similarly, since there is no service communication setting for the db server 123 from the outside world, an error object, which indicates the absence of the service communication setting for the db server 123 from the outside world, is inserted on the network diagram. The service communications from the web server 111 is set for the db server 123. However, since there is no service communication setting for the web server 111 from the outside world, there is even no indirect service communication setting.

Generally, the service task is achieved by performing some process in response to the request from the outside world. In the embodiment of the present invention, the outside world in this service task refers to the Internet 101. Since any device at which no communications arrives from the outside world is considered to provide no contribution to the service task, a setting error will likely exist in the device. Therefore, by checking the connectivity of each device with the external communication at the time of the service communication setting check, an indication is made for the server to which the external communication has not arrived, which is then alerted to the designer. This enables the designer to find a setting error indicating the presence of devices which provides no contribution to the service task.

Figure 24:
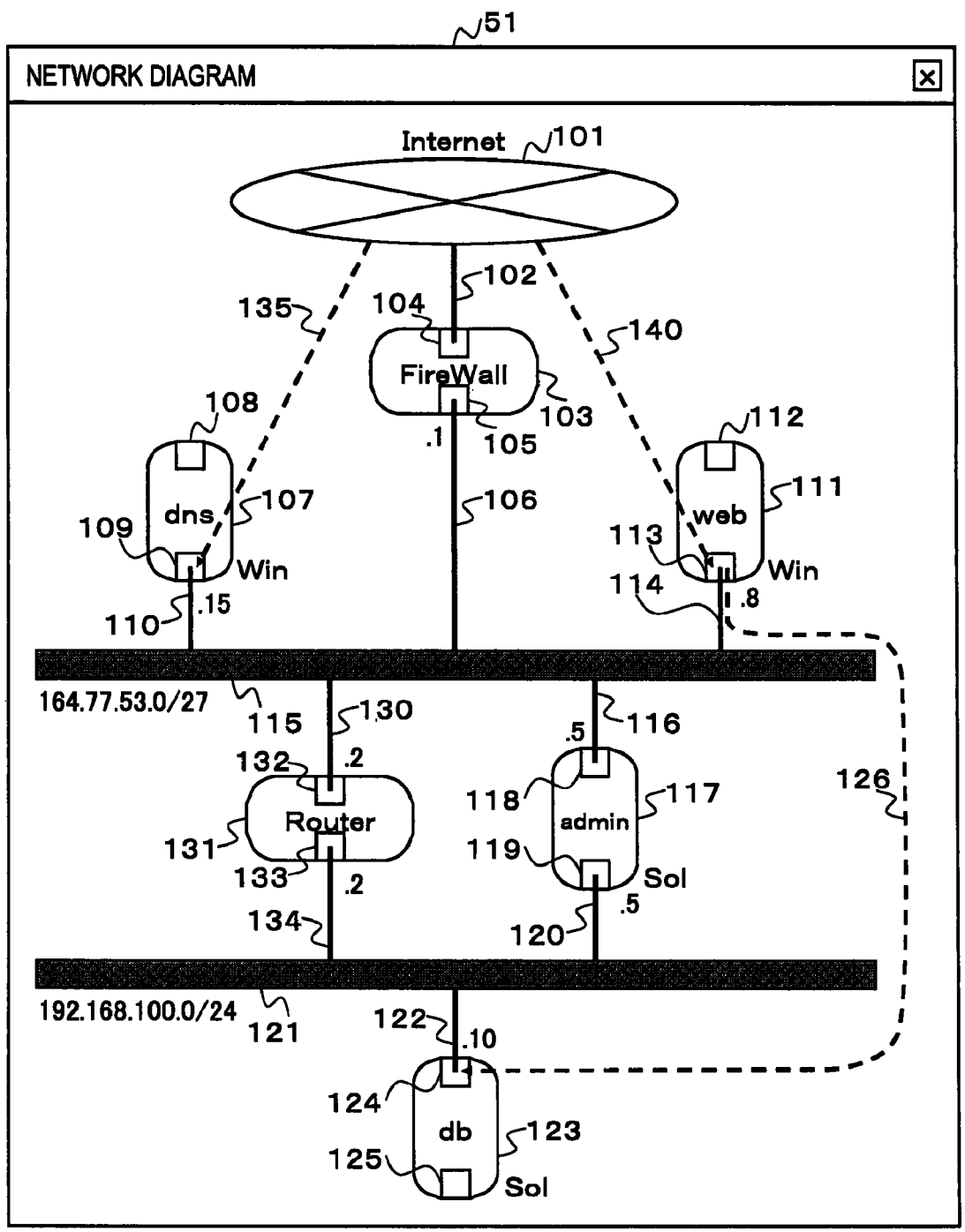
FIG. 24 is a chart illustrating an example of the network diagram to which an external communication is added.

FIG. 24 illustrates an example of the network diagram to which an external communication is added. With respect to the NIC 113 on the web server 111, for which the non-arrival of the external communication is indicated as shown in FIG. 23, the network diagram is modified by the designer, and the service communication setting 140 from the Internet 101 is set. Since the external communication is set for the web server 111, it is also set for the db server 123 indirectly, for which the service the communication setting 126 from the web server 111 is set.

As described above, the detection of setting errors by checking the basic information check, the service communication setting check, and the maintenance communication setting check enables the modification of the network diagram as initially designed in FIG. 6, which includes a mass of setting errors to the network diagram as designed in FIG. 24, which includes no setting error.

FIG. 25 illustrates an example of generic filter setting information. For security setting, a restriction needs to be provided for each device regarding which packet can be passed or transmitted or received. The filter setting information 59 of FIG. 25 is an example of definition for the filter setting for each device. The filter setting information creation unit 26 illustrated in FIG. 2 creates the filter information for performing the filtering setting for each device from each design information stored in the design information DB 14. At this moment, since the filtering program is different for different venders of the devices, the filter setting information creation unit 26 creates generic filter setting information 59 with information independent from the device type as the example illustrated in FIG. 25.

The filter setting information 59 of FIG. 25 is an example of the setting information as filters automatically generated from the design information DB 14, each of which are created as a generic file in text respectively, namely, Router_generalFilters.txt, which is a file for filter setting with respect to the Router 131, web_generalFilters.txt, which is a file for filter setting for the web server 111, and db_generalFilters.txt, which is a file for filter setting for the db server 123.

By converting the format of the generic filter setting information 59 which is created by the filter setting information creation unit 26 using conversion program depending on the vendors of the devices, a filter setting file can be obtained which is corresponding to the filtering program for the appropriate devices.

FIG. 26 illustrates an example of a generic filter setting file obtained from conversion of the generic filter setting information to an output format for specific filtering program. For example, db_generalFilters.txt, which is a file for filter setting to the db server 123 in the generic filter setting information 59 of FIG. 25, is rewritten by an output filter for the filtering program of the db server 123 to db_filters.txt, which is a filter setting file 60 in a format for the filtering program of the db server 123 as illustrated in FIG. 26.

When the db server 123 is constructed or set according to the network diagram actually created, the filter setting of the db server 123 is completed by only positioning a filter setting file 60 as illustrated in FIG. 26 in a predetermined place. This would significantly reduce the load on the operators.

Figure 27:
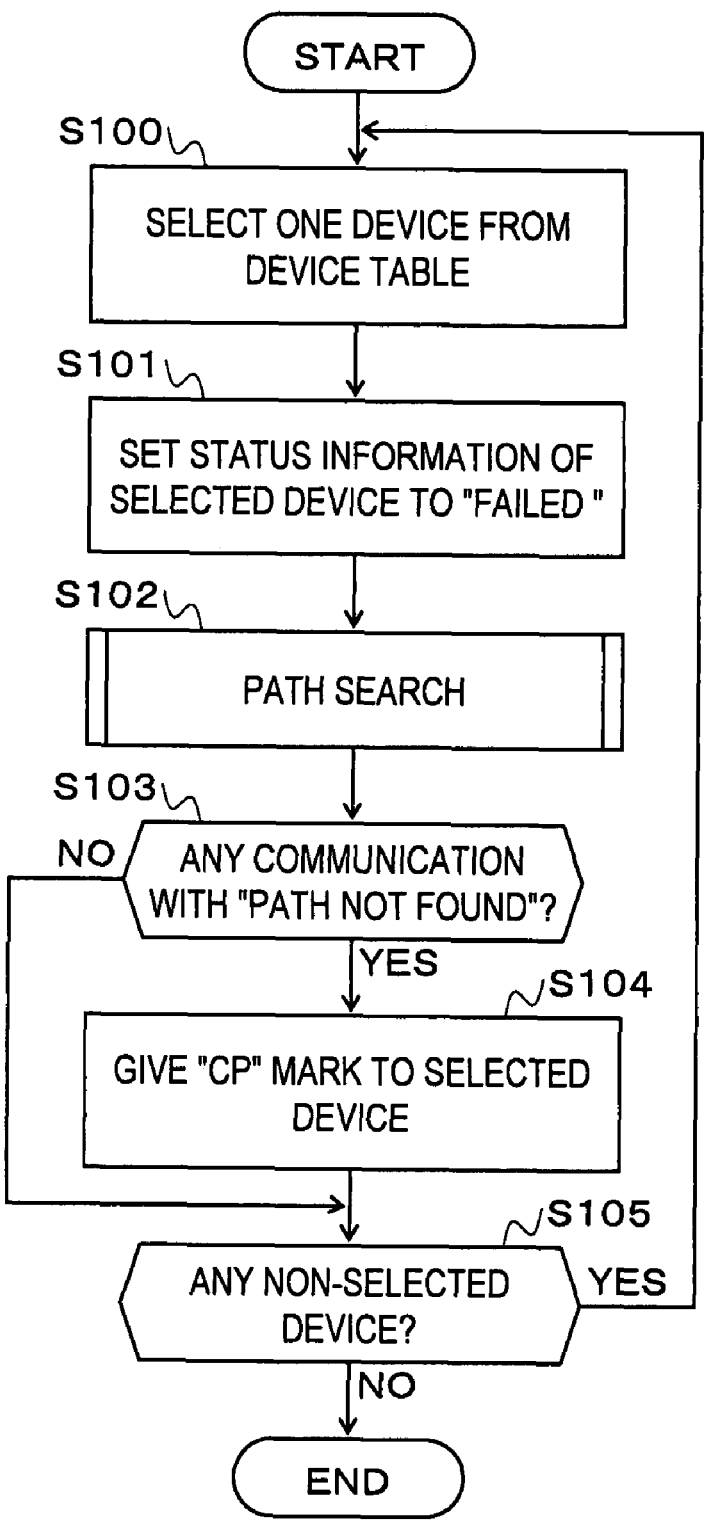
FIG. 27 is a flowchart of a failure simulation process.

FIG. 27 is a flowchart of a failure simulation process according to the embodiment of the present invention. The failure simulation unit 19 performs the service communication setting check process with the status of each device virtually in fault successively to extract a device which could be a critical point (CP) with less redundancy.

The failure simulation unit 19 selects one device from the device table 56 in step S100. In order to virtually make the selected device in a fault state, the status information of the selected device is set to "FAILED" in the device table 56 in step S101.

In this state, the path search process is performed for each service communication setting in step S102, and a determination is made as to whether there exists a service communication setting of "PATH NOT FOUND" in step S103. Although the path search process is performed in the operational logic as described in FIG. 18, when the status information of the device is "FAILED" in search for each device, the device would be processed as if it were not exist. When there exists a service communication setting of "PATH NOT FOUND", the CP information output unit 20 gives a "CP" mark to the selected device on the network diagram in step S104.

A determination is made as to whether there exists a non-selected device in the device table 56 in step S105. When there exists a non-selected device, the process returns to the process of step S100. Thereafter, the processes of steps S100 through S105 are repeated until there does not exist a non-selected device in the device table 56.

Figure 28:
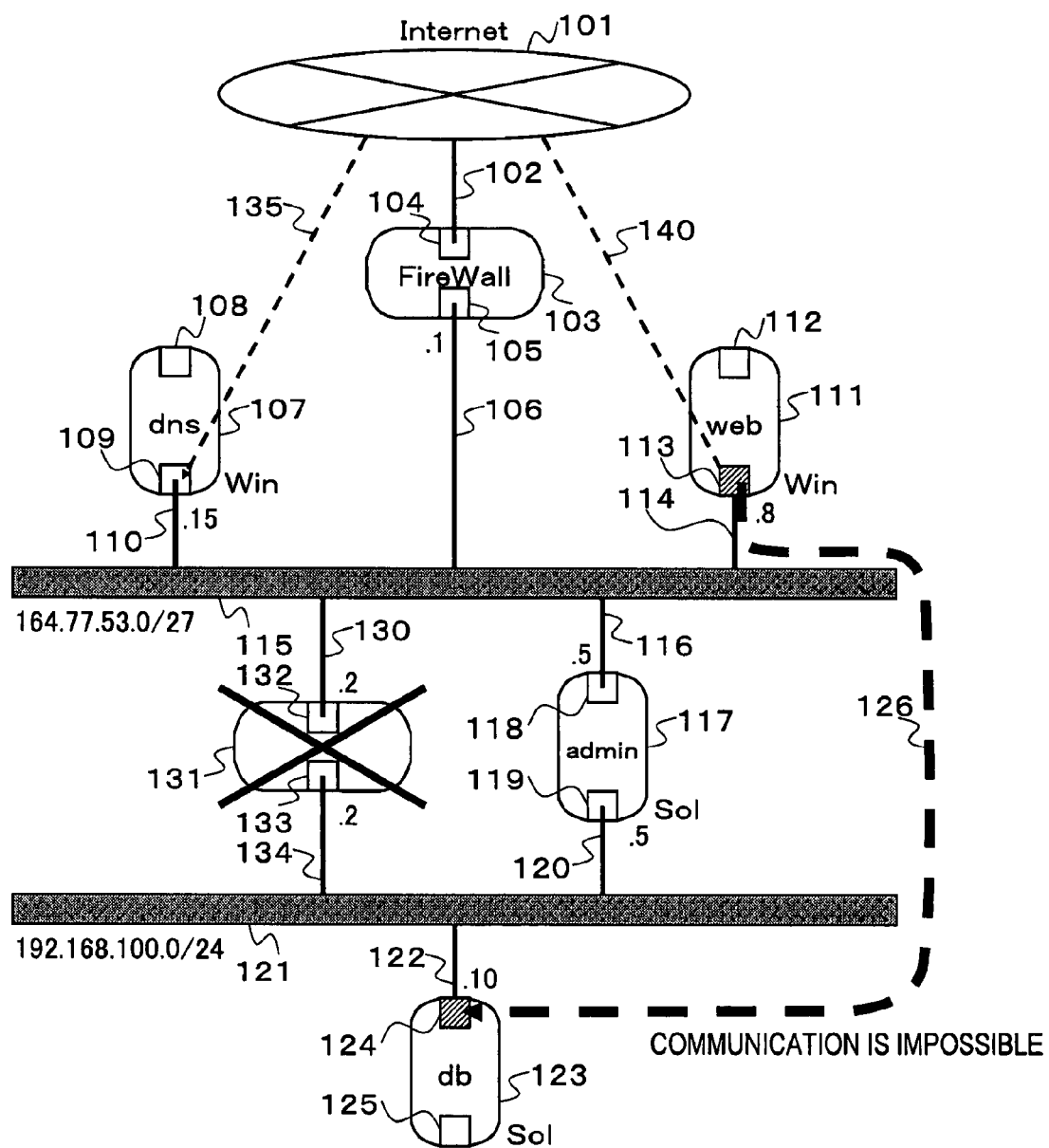
FIG. 28 is a chart illustrating an example of an operation of the failure simulation.

FIG. 28 illustrates an example of an operation of the failure simulation. In the example of FIG. 28, the Router 131 is virtually made to a fault state. In this state, a path search is performed for each service communication setting. At this moment, since the communication setting 126 turns to "PATH NOT FOUND" due to the fault state of the Router 131, the Router 131 would be determined to be a device corresponding to the critical point. In this respect, it is not necessary to display the information indicating, namely, "FAILED" or "PATH NOT FOUND" on the window 51 of the network diagram during the fault simulation.

Figure 29:
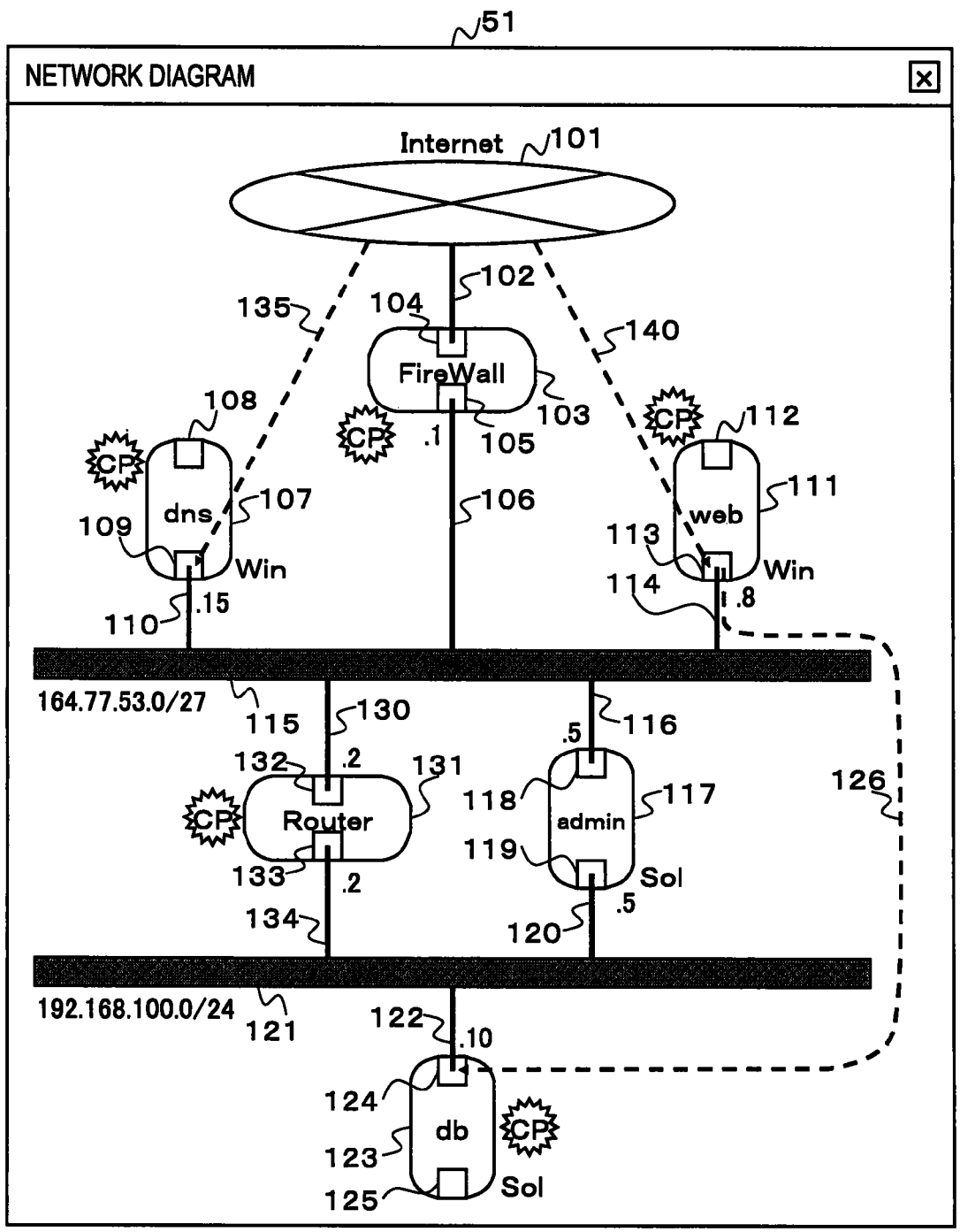
FIG. 29 is a chart illustrating an example of the network diagram after the completion of the failure simulation.

FIG. 29 illustrates an example of the network diagram after the completion of the failure simulation. Any device, which is determined to be a critical point by the failure simulation process, is given a "CP" mark. In the network diagram of FIG. 29, the "CP" mark is given to the FireWall 103, the dns server 107, the web server 111, the db server 123 and the Router 131. When the device with the "CP" mark fails when the network system is constructed according to the network diagram as illustrated in FIG. 29, severe effects would be imposed on the service task.

Additionally, the maintenance communications generally needs to be set for each device independently, regardless of the redundant configuration. Therefore, it is not necessary to detect a critical point for the maintenance communications and the maintenance communications are ignored at the time of fault simulation.

Figure 30:
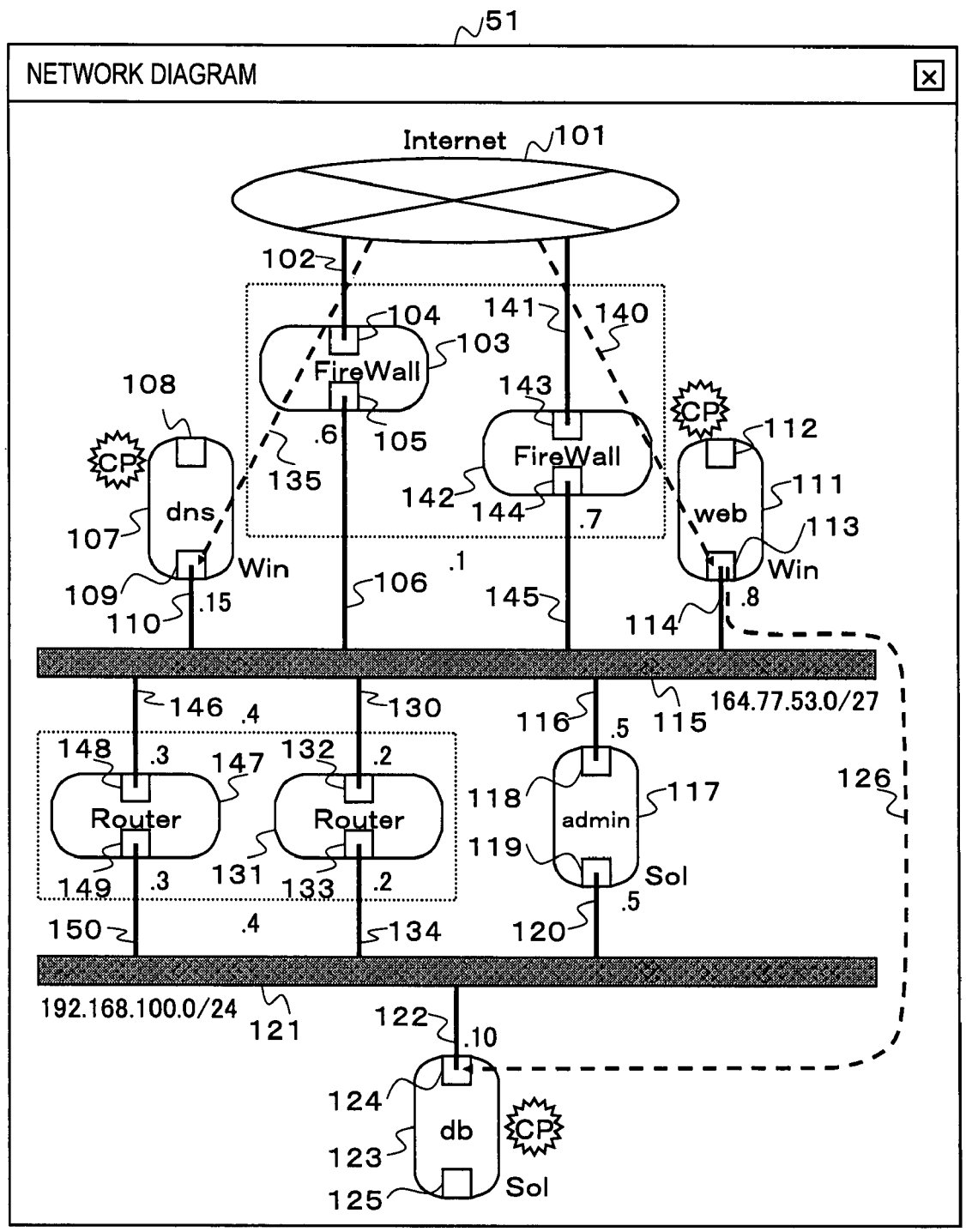
FIG. 30 is a chart illustrating an example of the network diagram in which CPs are reduced by duplexing of FireWalls and Routers.

FIG. 30 illustrates an example of the network diagram in which CPs are reduced by duplexing of FireWalls and Routers. In the network diagram of FIG. 30, a FireWall 142 and a Router 147 are newly placed on the network diagram as compared to that of FIG. 29. Upon the fault simulation performed again in this state, the "CP" marks are erased for the Router 131 and the FireWall 103.

The dns server 107, the web server 111 and the db server 123 still remain in the CP state, since they are not in the redundant configuration. However, since it is clearly illustrated on the network diagram that these devices could be "the device imposing significant effects due to their faults", the network diagram as illustrated in FIG. 30 is expected to provide useful information for the subsequent design/construction operations or operational plan decision, even if the operation is continued for some reason with these devices left in the CP state.

Since the Routers 131 and 147 are both in the redundant configuration, a virtual address (VirtualAddress) is set for these Routers for recognizing two Routers as a whole, in addition to the actual addresses held by their NICs. In the example of FIG. 30, the virtual address on the side of the Hub 115 is set to "164.77.53.4", while the virtual address on the side of the Hub 121 is set to "192.168.100.4". The virtual addresses are similarly set for the redundant configuration of the FireWalls 103 and 142.

For the Routing setting for the web server 111 under these conditions, the address of the Router is automatically recognized as the virtual address of "164.77.53.4", and a routing or filtering rule with such a setting is output as a network setting file. This is also the case with the network setting files of the db server 123.

FIG. 31 illustrates an example of redundant configuration data. For the redundant configuration management, redundant configuration data 61 as in FIG. 31 is used which is an object for storing the parent-child relationships on the network. In the redundant configuration data 61 of FIG. 31, the parent-child relationship between the virtual addresses (VirtualAddresses) and the NICs is set for the Routers and the FireWalls which are made in redundant configuration at FIG. 30. For example, the suitable information may be obtained by using information for the parent of the redundant configuration data 61 at the time of filter setting information creation, or by traversing relationships from a parent to its child of the redundant configuration data 61 at the time of path search.

The network design processing device 1 illustrated in FIG. 1 may be realized by, for example, a server device and a client terminal. For example, by placing the input/output device 2, the network diagram creation processing unit 10, and the selective communication display control unit 11 illustrated in FIG. 1 in a plurality of client terminals, and the remaining parts on the server device, the design diagram data held by the server device in the design diagram data storage unit 12 may be shared by each client terminal, and the network design may be jointly performed by a plurality of designers who use each client terminal.

The above-mentioned processes at each step may be realized by a computer and software program, and such program may be stored in computer readable recording medium or provided through the network.

According to the present invention, in the network design, in particular, a support device for constructing a high-quality network system which eliminates setting errors or the setting oversight for the service communications and the maintenance communications and so on is realized.

What is claimed is:

1. A network design processing device for inputting a network diagram through a computer screen, analyzing design diagram data obtained from the input network diagram, and extracting network design information to store the network design information in a database, the network design processing device comprising:

a network diagram creation processing unit for inputting setting information for service communications for task execution in a network system to be designed and setting information for maintenance communications for maintenance management of the network system, while differentiating the setting information for service communications and the setting information for maintenance communications on the network diagram, and for displaying a line joining a starting point and an ending point of a communication on the network diagram in different display modes between the service communications and the maintenance communications;

a design diagram data storage unit for storing the design diagram data expressing the network diagram, the design diagram data including the setting information for service communications and the setting information for maintenance communications inputted by the network diagram creation processing unit; and a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;

a communication setting information check unit for analyzing the setting information for service communications stored in the design information database, searching for a server having communications from outside of the network system to be designed, thereby searching for another server being chained and having communications with the server, and detecting a remaining server which deviates from a communication-chain; and a check result output unit for, when a deviating server deviating from the communication-chain is detected, displaying, on the network diagram, information indicating that the deviating server has no interaction with the outside world.

2. The network design processing device according to claim 1, further comprising:

a selective communication display control unit for instructing to display any one of the setting information for service communications or the setting information for maintenance communications, from the inputted network diagram, for a communication having a specific network device designated as the starting point or the ending point;

wherein, when a selective communication display is instructed by the selective communication display control unit for a specific network device, the network diagram creation processing unit displays a setting information for the communication having the specific network device designated as the starting point or the ending point on the network diagram, while hiding the setting information for the other communications thereon.

3. The network design processing device according to claim 2, wherein the selective communication display control unit has a unit for instructing to display a setting information for a specific communication in accordance with a type of communication or communication protocol of the designated service communications or maintenance communications, and wherein, when a selective communication display is instructed by the selective communication display control unit for a specific communication or protocol type, the network diagram creation processing unit displays a setting information for the communication for the designated communication or protocol type on the network diagram, while hiding a setting information for the other communication thereon.

4. The network design processing device according to claim 1, wherein the network diagram creation processing unit places the setting information for service communications that is inputted on a different layer of a plurality of layers forming the network diagram in accordance with a type of communication or communication protocol or a combination thereof for the service communications or the maintenance communications, and selects a specific layer or group of layers to be displayed on the network diagram to display the setting information for communications on the network diagram.

5. The network design processing device according to claim 1, further comprising:

a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;

a communication setting information check unit for analyzing the setting information for communications stored in the design information database, and detecting a network device that does not correspond to a starting point or ending point of a communication; and a check result output unit for, when a network device that does not correspond to the starting point or the ending point of the communication is detected, displaying information that indicates the detected network device on the network diagram.

6. The network design processing device according to claim 1, wherein, when the server deviating from the communication-chain is a device corresponding to a starting point of the maintenance communications, the communication setting information check unit does not set the device as an object to be displayed, by the check result output unit, information indicating no interaction with the outside world.

7. The network design processing device according to claim 1, further comprising:

a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;

a communication setting information check unit for analyzing the setting information for maintenance communications stored in the design information database, and detecting a communication that has no path from the starting point to the ending point of the maintenance communication or a device that does not correspond to the starting point or the ending point of the maintenance communication; and a check result output unit for, when a communication that has no path from the starting point to the ending point of the maintenance communication is detected by the communication setting information check unit, or when a device that does not correspond to the starting point or the ending point of the maintenance communication is detected by the communication setting information check unit, displaying information on the detection result on the network diagram.

8. The network design processing device according to claim 1, comprising:

a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;

a failure simulation unit for causing a pseudo-failure for each device one by one on the basis of the information for each device that is stored in the design information database, performing a path search to determine whether the service communications are established from the starting point to the ending point based on the setting information for service communications with reference to the connection information for each of the devices, and detecting the device with the pseudo-failure when impossibility of the service communications are detected; and a critical point (CP) information output unit for displaying the detected device with the pseudo-failure on the network diagram with marking a critical point.

9. A network design processing program stored on a non-transitory computer-readable medium to cause a computer to execute processing for inputting a network diagram through a computer screen, analyzing design diagram data obtained from the input network diagram, and extracting network design information to store it in a database, the program causing the computer to function as:

a network diagram creation processing unit for inputting setting information for service communications for task execution in a network system to be designed and setting information for maintenance communications for maintenance management of the network system, while differentiating the setting information for service communications and the setting information for maintenance communications on the network diagram, and for displaying a line joining a starting point and an ending point of a communication on the network diagram in different display modes between the service communications and the maintenance communications;

a design diagram data storage unit for storing the design diagram data expressing the network diagram, the design diagram data including the setting information for service communications and the setting information for maintenance communications inputted by the network diagram creation processing unit; and a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;

a communication setting information check unit for analyzing the setting information for service communications stored in the design information database, searching for a server having communications from outside of the network system to be designed, thereby searching for another server being chained and having communications with the server, and detecting a remaining server which deviates from a communication-chain; and a check result output unit for, when a deviating server deviating from the communication-chain is detected, displaying, on the network diagram, information indicating that the deviating server has no interaction with the outside world.

10. The network design processing program according to claim 9, further comprising:

a selective communication display control unit for instructing to display any one of the setting information for service communications or the setting information for maintenance communications, from the inputted network diagram, for a communication having a specific network device designated as the starting point or the ending point;

wherein, when a selective communication display is instructed by the selective communication display control unit for a specific network device, the network diagram creation processing unit displays a setting information for the communication having the specific network device designated as the starting point or the ending point on the network diagram, while hiding the setting information for the other communications thereon.

11. The network design processing program according to claim 10, wherein the selective communication display control unit has a unit for instructing to display a setting information for a specific communication in accordance with a type of communication or communication protocol of the designated service communications or maintenance communications, and wherein, when a selective communication display is instructed by the selective communication display control unit for a specific communication or protocol type, the network diagram creation processing unit displays a setting information for the communication for the designated communication or protocol type on the network diagram, while hiding a setting information for the other communication thereon.

12. The network design processing program according to claim 9, wherein the network diagram creation processing unit places the setting information for service communications that is inputted on a different layer of a plurality of layers forming the network diagram in accordance with a type of communication or communication protocol or a combination thereof for the service communications or the maintenance communications, and selects a specific layer or group of layers to be displayed on the network diagram to display the setting information for communications on the network diagram.

13. The network design processing program according to claim 9, further comprising:

a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;

a communication setting information check unit for analyzing the setting information for communications stored in the design information database, and detecting a network device that does not correspond to a starting point or ending point of a communication; and a check result output unit for, when a network device that does not correspond to the starting point or the ending point of the communication is detected, displaying information that indicates the detected network device on the network diagram.

14. The network design processing program according to claim 9, wherein, when the server deviating from the communication-chain is a device corresponding to a starting point of the maintenance communications, the communication setting information check unit does not set the device as an object to be displayed, by the check result output unit, information indicating no interaction with the outside world.

15. The network design processing program according to claim 9, further comprising:
   a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;
   a communication setting information check unit for analyzing the setting information for maintenance communications stored in the design information database, and detecting a communication that has no path from the starting point to the ending point of the maintenance communication or a device that does not correspond to the starting point or the ending point of the maintenance communication; and
   a check result output unit for, when a communication that has no path from the starting point to the ending point of the maintenance communication is detected by the communication setting information check unit, or when a device that does not correspond to the starting point or the ending point of the maintenance communication is detected by the communication setting information check unit, displaying information on the detection result on the network diagram.

16. The network design processing program according to claim 9, comprising:
   a design diagram data analysis unit for analyzing the design diagram data read from the design diagram data storage unit, extracting information for each device constituting the network and a connection information of the each device constituting the network as well as the setting information for service communications and the setting information for maintenance communications, and storing the extracted information in a design information database;
   a failure simulation unit for causing a pseudo-failure for each device one by one on the basis of the information for each device that is stored in the design information database, performing a path search to determine whether the service communications are established from the starting point to the ending point based on the setting information for service communications with reference to the connection information for each of the devices, and detecting the device with the pseudo-failure when impossibility of the service communications are detected; and
   a critical point (CP) information output unit for displaying the detected device with the pseudo-failure on the network diagram with marking a critical point.

* * * * *

UNITED STATES PATENT AND TRADEMARK OFFICE
CERTIFICATE OF CORRECTION

| | | |
|---|---|---|
| PATENT NO. | : 7,860,698 B2 | Page 1 of 1 |
| APPLICATION NO. | : 11/976624 | |
| DATED | : December 28, 2010 | |
| INVENTOR(S) | : Toshiya Yamazaki et al. | |

It is certified that error appears in the above-identified patent and that said Letters Patent is hereby corrected as shown below:

Title Page, Column 1, Line 1, Below "Prior Publication Data US 2008/0091387 A1   Apr. 17, 2008" insert item (63)

--Related U.S. Application Data
(63)   Continuation of application No. PCT/JP05/07769,
       Filed on April 25, 2005.--

Signed and Sealed this
Thirteenth Day of September, 2011

David J. Kappos
*Director of the United States Patent and Trademark Office*